(12) United States Patent
Nobori

(10) Patent No.: US 7,736,069 B2
(45) Date of Patent: Jun. 15, 2010

(54) MOVING IMAGE DISPLAY DEVICE AND MOVING IMAGE DISPLAY METHOD

(75) Inventor: Tatsuhiko Nobori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1063 days.

(21) Appl. No.: 11/436,021

(22) Filed: May 18, 2006

(65) Prior Publication Data

US 2007/0025683 A1    Feb. 1, 2007

(30) Foreign Application Priority Data

Jul. 27, 2005    (JP) .............................. 2005-216677
Mar. 23, 2006    (JP) .............................. 2006-080231

(51) Int. Cl.
G09G 3/36    (2006.01)
G09G 3/30    (2006.01)

(52) U.S. Cl. .................... 385/89; 345/690; 348/672; 348/678

(58) Field of Classification Search ............. 345/87, 345/89, 690; 348/672–678
See application file for complete search history.

(56) References Cited

U.S. PATENT DOCUMENTS

| 5,751,378 | A * | 5/1998 | Chen et al. ................... 348/700 |
| 6,795,053 | B1 | 9/2004 | Funamoto et al. | |
| 6,947,025 | B2 | 9/2005 | Iisaka et al. | |
| 6,952,235 | B2 | 10/2005 | Park et al. | |
| 7,095,451 | B2 | 8/2006 | Kitazawa et al. | |
| 7,136,044 | B2 | 11/2006 | Sasaki | |
| 7,199,840 | B2 | 4/2007 | Shiota | |
| 2004/0001165 | A1 * | 1/2004 | Shiota et al. ................... 348/678 |
| 2004/0008267 | A1 * | 1/2004 | Chen et al. ................... 348/229.1 |
| 2004/0248022 | A1 * | 12/2004 | Yoshida et al. ................... 430/32 |
| 2005/0270268 | A1 | 12/2005 | Iisaka et al. | |
| 2006/0268180 | A1 * | 11/2006 | Chou ................... 348/673 |

FOREIGN PATENT DOCUMENTS

| JP | A 2001-166739 | 6/2001 |
| JP | A 2001-343957 | 12/2001 |
| JP | A 2004-45634 | 2/2004 |
| JP | A 2004-163518 | 6/2004 |
| JP | A 2004-282661 | 10/2004 |
| JP | A 2004-294784 | 10/2004 |
| JP | A 2005-184048 | 7/2005 |
| JP | A 2006-120030 | 5/2006 |
| WO | WO 03/032080 A1 | 4/2003 |

* cited by examiner

Primary Examiner—Bipin Shalwala
Assistant Examiner—Benyam Ketema
(74) Attorney, Agent, or Firm—Oliff & Berridge, PLC

(57) ABSTRACT

To provide a technology for performing brightness range expansion processing suitable for a scene change when a scene change occurs. If an expansion coefficient output mode determination module 250 detects a scene change, it changes an expansion coefficient output mode from a normal mode to a scene change mode. An expansion coefficient derivation module 200 outputs an ideal expansion coefficient Gid(n) if the scene change is detected, and outputs a corrected expansion coefficient G(n) if the scene change is not detected.

9 Claims, 20 Drawing Sheets

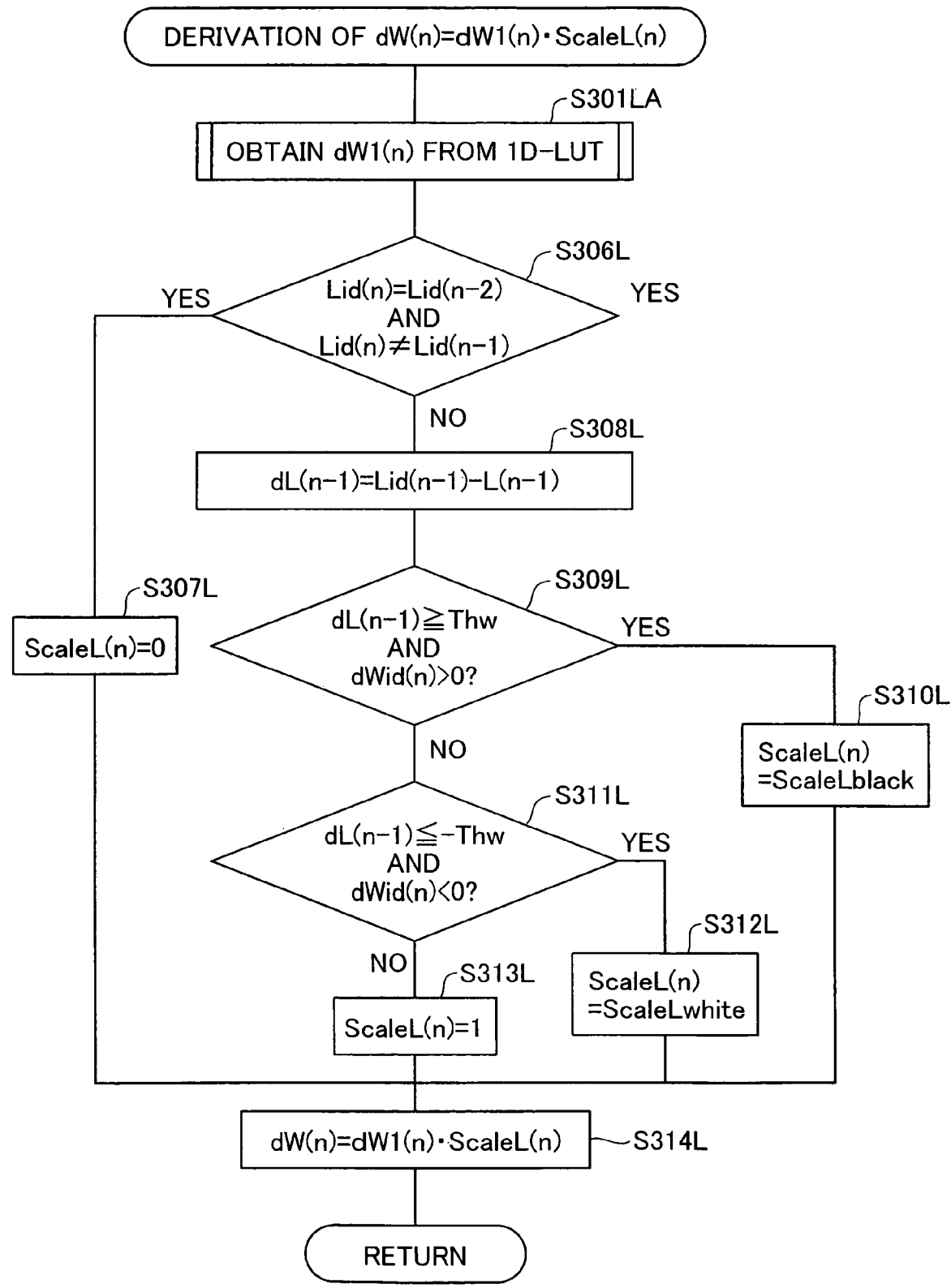

MOVING IMAGE DISPLAY DEVICE AND MOVING IMAGE DISPLAY METHOD

CROSS REFERENCE

The present application is based on, and claims priority from, Japanese Applications No. 2005-216677 filed Jul. 27, 2005 and No. 2006-80231 filed Mar. 23, 2006, the disclosures of which are herein incorporated by reference.

BACKGROUND

1. Technical Field

The present invention relates to a technology for displaying moving images based on moving image data.

2. Related Art

In connection with moving image display devices such as projectors, a technology has conventionally been proposed that increases contrast of an image by performing brightness range expansion processing to widen the brightness range of the image data for one frame of moving image data.

Furthermore, in connection with moving image display apparatuses such as projectors that includes an illumination device, a technology has been proposed that adjusts image brightness by performing light modulation control for the illumination device so as to improve image quality.

However, because brightness range expansion processing of moving image data is typically carried out in the conventional art without taking into account sudden image (that is, image brightness) changes between frames, there is a possibility to deteriorate image quality due to such brightness range expansion processing. In the discussion below, a sudden image change between frames is termed a "scene change", and the period between the occurrence of a scene change and the occurrence of next scene change is termed a "scene". One example of the occurrence of a scene change is a change of scene (situation) in moving images.

In addition, because light modulation according to light modulation control is carried out in the conventional art without taking scene changes into account, there is a possibility to deteriorate image quality due to such light modulation.

SUMMARY

A first object of the invention is to provide a technology for performing brightness range expansion processing suitable for a new scene when a scene change occurs. A second object is to provide a technology for performing light modulation suitable for a new scene when a scene change occurs.

According to a first aspect of the invention, there is provided a moving image display apparatus that displays moving images based on moving image data. The moving image display apparatus includes: an expansion coefficient derivation module that, based on an image feature amount pertaining to a brightness of image data for one frame of the moving image data, derives and outputs an expansion coefficient to be used for brightness range expansion processing that widens the brightness range for the image data, for each frame of the moving image data; a brightness range expansion processor that executes the brightness range expansion processing of the image data based on the expansion coefficient output by the expansion coefficient derivation module; and a scene change detector that detects a scene change indicating that a scene in the moving image has changed. The expansion coefficient derivation module, if the scene change is detected, outputs a current-frame ideal expansion coefficient that is determined according to the image feature amount for a current frame, and if the scene change is not detected, outputs a current-frame corrected expansion coefficient that is obtained by correcting the current-frame ideal expansion coefficient based on a predetermined rule.

According to the first aspect of the invention, because if the scene change is detected, the expansion coefficient derivation module outputs the current-frame ideal expansion coefficient suitable for a new scene, the brightness range expansion processing suitable for the new scene can be performed.

In the above apparatus, the expansion coefficient derivation module may determine the current-frame corrected expansion coefficient such that an absolute value of a corrected expansion coefficient difference is smaller than an absolute value of an ideal expansion coefficient difference and a sign of the corrected expansion coefficient difference is the same as a sign of the ideal expansion coefficient difference. The ideal expansion coefficient difference is obtained by subtracting a previous-frame actual expansion coefficient from the current-frame ideal expansion coefficient, wherein the previous-frame actual expansion coefficient is an expansion coefficient used by the brightness range expansion processor for the brightness range expansion processing for a previous frame. The corrected expansion coefficient difference is obtained by subtracting the previous-frame actual expansion coefficient from the current-frame corrected expansion coefficient.

By employing this arrangement, if the scene change is not detected, a sudden change in the expansion coefficient from the previous frame can be suppressed.

In the above apparatus, the expansion coefficient derivation module, (i) after the scene change is detected, may output the current-frame ideal expansion coefficient until a predetermined stop condition is satisfied, and (ii) after the stop condition is satisfied, may output the current-frame corrected expansion coefficient.

By employing this arrangement, the brightness range expansion processing suitable for each scene can be carried out from the time of detection of the scene change to the time that the stop condition is satisfied.

In the above apparatus, the image feature amount may include a plurality of image feature amounts obtained with respect to a brightness histogram of the image data, and the expansion coefficient derivation module may derive the ideal expansion coefficient with reference to a preset expansion coefficient lookup table using the plurality of image feature amounts.

By carrying out the brightness range expansion processing of the image data based on the plurality of image feature amounts, the brightness range expansion processing suitable for image data can be performed.

The above apparatus may further includes: an illumination device; a light modulation coefficient derivation module that, based on the image feature amount, derives and outputs a light modulation coefficient to be used to modulate a light amount emitted by the illumination device, for each frame of the moving image data; and a light modulation module that performs light modulation for the illumination device based on the light modulation coefficient output by the light modulation coefficient derivation module. The light modulation coefficient derivation module, if the scene change is detected, may output a current-frame ideal light modulation coefficient that is determined according to the image feature amount for the current frame, and if the scene change is not detected, may output a current-frame corrected light modulation coefficient that is obtained by correcting the current-frame ideal light modulation coefficient based on a predetermined rule.

According to the above arrangement, because if the scene change is detected, the light modulation coefficient derivation module outputs the current-frame ideal light modulation coefficient suitable for a new scene, the light modulation suitable for the new scene can be performed.

According to a second aspect of the invention, there is provided a moving image display apparatus that displays moving images based on moving image data. The moving image display apparatus includes: an illumination device; a light modulation coefficient derivation module that, based on an image feature amount pertaining to a brightness of image data for one frame of the moving image data, derives and outputs a light modulation coefficient to be used to modulate a light amount emitted by the illumination device, for each frame of the moving image data; a light modulation module that performs light modulation for the illumination device based on the light modulation coefficient output by the light modulation coefficient derivation module; and a scene change detector that detects a scene change indicating that a scene in the moving image has changed. The light modulation coefficient derivation module, if the scene change is detected, outputs a current-frame ideal light modulation coefficient that is determined according to the image feature amount for the current frame, and if the scene change is not detected, outputs a current-frame corrected light modulation coefficient that is obtained by correcting the current-frame ideal light modulation coefficient based on a predetermined rule.

According to the second aspect of the invention, because if the scene change is detected, the light modulation coefficient derivation module outputs the current-frame ideal light modulation coefficient suitable for a new scene, the light modulation suitable for the new scene can be performed.

It should be noted that the present invention may be actualized by a diversity of applications such as a moving image display apparatus, a method for displaying moving images, computer programs that attain these methods or functions of these apparatuses, and recording media in which such computer programs are recorded.

These and other objects, features, aspects, and advantages of the present invention will become more apparent from the following detailed description of the preferred embodiments with the accompanying drawings.

BRIEF DESCRIPTION OF THE DRAWINGS

FIG. 20 is a flow chart showing derivation process to obtain corrected change amount dW(n) for corrected light modulation coefficient L(n).

DESCRIPTION OF THE PREFERRED EMBODIMENT

Embodiments of the present invention are discussed below based on examples in the following order.
A. First Embodiment:
  A-1. Device Configuration and Summary of Processing:
  A-2. Calculation of Expansion Coefficient:
  A-3. Calculation of Light Modulation Coefficient:
B. Second Embodiment:

A. First Embodiment

Figure 1:
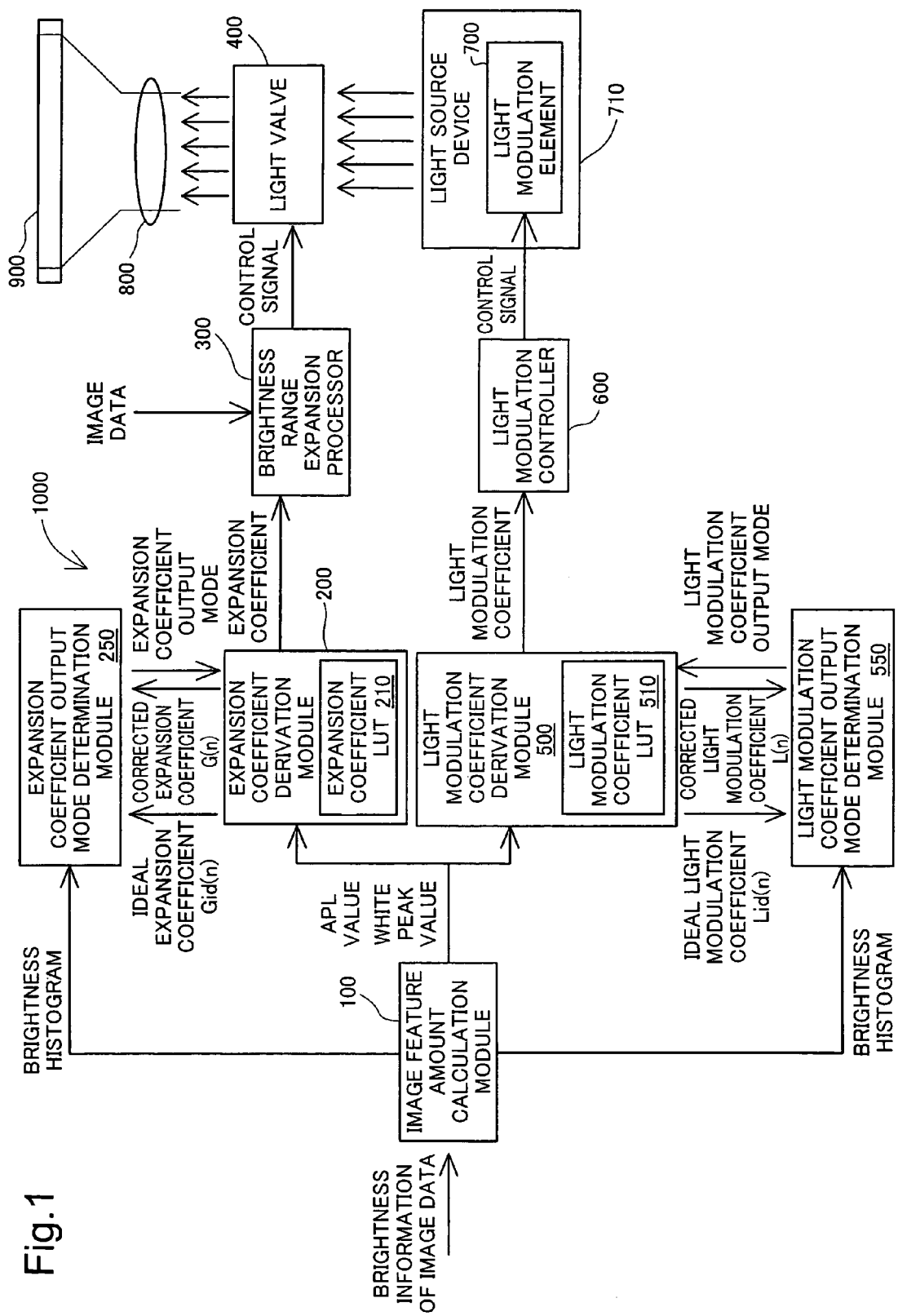
FIG. 1 is a block diagram of a moving image display apparatus 1000 according to a first embodiment of the present invention.

A-1. Device Configuration and Summary of Processing:

FIG. 1 is a block diagram of a moving image display apparatus 1000 according to a first embodiment of the present invention. The moving image display apparatus 1000 has the functions of executing brightness range expansion processing to widen a brightness range of image data for each frame of moving image data and executing light modulation control for a light source device 710, based on an image feature amount of image data. The moving image display apparatus 1000 further has the function of detecting scene changes at which the image changes suddenly between frames and executing the brightness range expansion processing and the light modulation control based on whether or not a scene change is detected. In the discussion below, the period between the occurrence of a scene change and the occurrence of a next scene change represents one scene.

The moving image display apparatus 1000 is a projector that projects and displays images onto a screen 900. The moving image display apparatus 1000 includes an image feature amount calculation module 100, an expansion coefficient derivation module 200, an expansion coefficient output mode determination module 250, a brightness range expansion processor 300, a light valve 400, a light modulation coefficient derivation module 500, a light modulation coefficient output mode determination module 550, a light modulation controller 600, a light source device 710 and a projection optical system 800. The light source device 710 includes a light modulation element 700 such as a liquid crystal panel including switching transistors, for example. The light source device 710 corresponds to an illumination device of the present invention, and the light modulation element 700 corresponds to a light modulation module of the present invention. The light modulation module is not limited to the light modulation element 700, and may be a louver that is disposed in front of the light source device 710 and adjusts the amount of light emitted from the light source device 710 by being opened and closed.

In the description below, a current frame is deemed the $n^{th}$ frame (where n is a natural number). The image feature amount calculation module 100 calculates APL (Average Picture Level) and white peak value based on the brightness of image data and outputs the results to the expansion coefficient derivation module 200 and the light modulation coefficient derivation module 500. The APL value and white peak value are described in detail below. In addition, the image feature amount calculation module 100 generates a brightness histogram for image data and outputs the result to the expansion coefficient output mode determination module 250 and the light modulation coefficient output mode determination module 550.

The expansion coefficient derivation module 200 uses the APL value and white peak value to determine an ideal expansion coefficient Gid(n) with reference to an expansion coefficient lookup table (hereinafter "LUT") 210. The module 200 further derives a corrected expansion coefficient G(n) by correcting the ideal expansion coefficient Gid(n) based on a predetermined rule. In the discussion below, the ideal expansion coefficient for the $n^{th}$ frame is written as "Gid(n)". Therefore, the ideal expansion coefficient for the $(n-1)^{th}$ frame is written as Gid(n−1). The same rule is applied for the corrected expansion coefficient. The derivation of the ideal expansion coefficient Gid(n) and the corrected expansion coefficient G(n) is described in detail below. The expansion coefficient output mode determination module 250 detects a scene change based on the ideal expansion coefficient Gid(n), the corrected expansion coefficient G(n) and the brightness histogram, and determines an expansion coefficient output mode to be used. The expansion coefficient output mode is described in detail below. The expansion coefficient derivation module 200 outputs either the ideal expansion coefficient Gid(n) or the corrected expansion coefficient G(n) according to the expansion coefficient output mode. The brightness range expansion processor 300 performs brightness range expansion processing of the image data based on an expansion ratio determined using the expansion coefficient output by the module 200 and controls the light valve 400 based on the brightness range expansion-processed image data.

The light modulation coefficient derivation module 500 uses the APL value and white peak value to determines an ideal light modulation coefficient Lid(n) with reference to a preset light modulation coefficient LUT 510. The module 500 further derives a corrected light modulation coefficient L(n) by correcting the ideal light modulation coefficient Lid(n) based on a predetermined rule. The light modulation coefficient output mode determination module 550 detects a scene change based on the ideal light modulation coefficient Lid(n), the corrected light modulation coefficient L(n) and the brightness histogram, and determines a light modulation coefficient output mode to be used. The light modulation coefficient output mode is described in detail below. The light modulation coefficient derivation module 500 outputs either the ideal light modulation coefficient Lid(n) or the corrected light modulation coefficient L(n) according to the light modulation coefficient output mode. The light modulation controller 600 controls the light modulation element 700 of light source device 710 (e.g. a discharge lamp) based on the light modulation coefficient output by the module 500. The expansion coefficient output mode determination module 250 and the light modulation coefficient output mode determination module 550 corresponds to a scene change detector of the present invention.

The image feature amount calculation module 100 calculates the APL value and the white peak value WP based on the brightness of image data. The brightness Y for one pixel of image data is defined, for example, by the equations (1) and (2) below.

$$Y = 0.299R + 0.587G + 0.144B \quad (1)$$

$$Y = \max(R, G, B) \quad (2)$$

Figure 2:
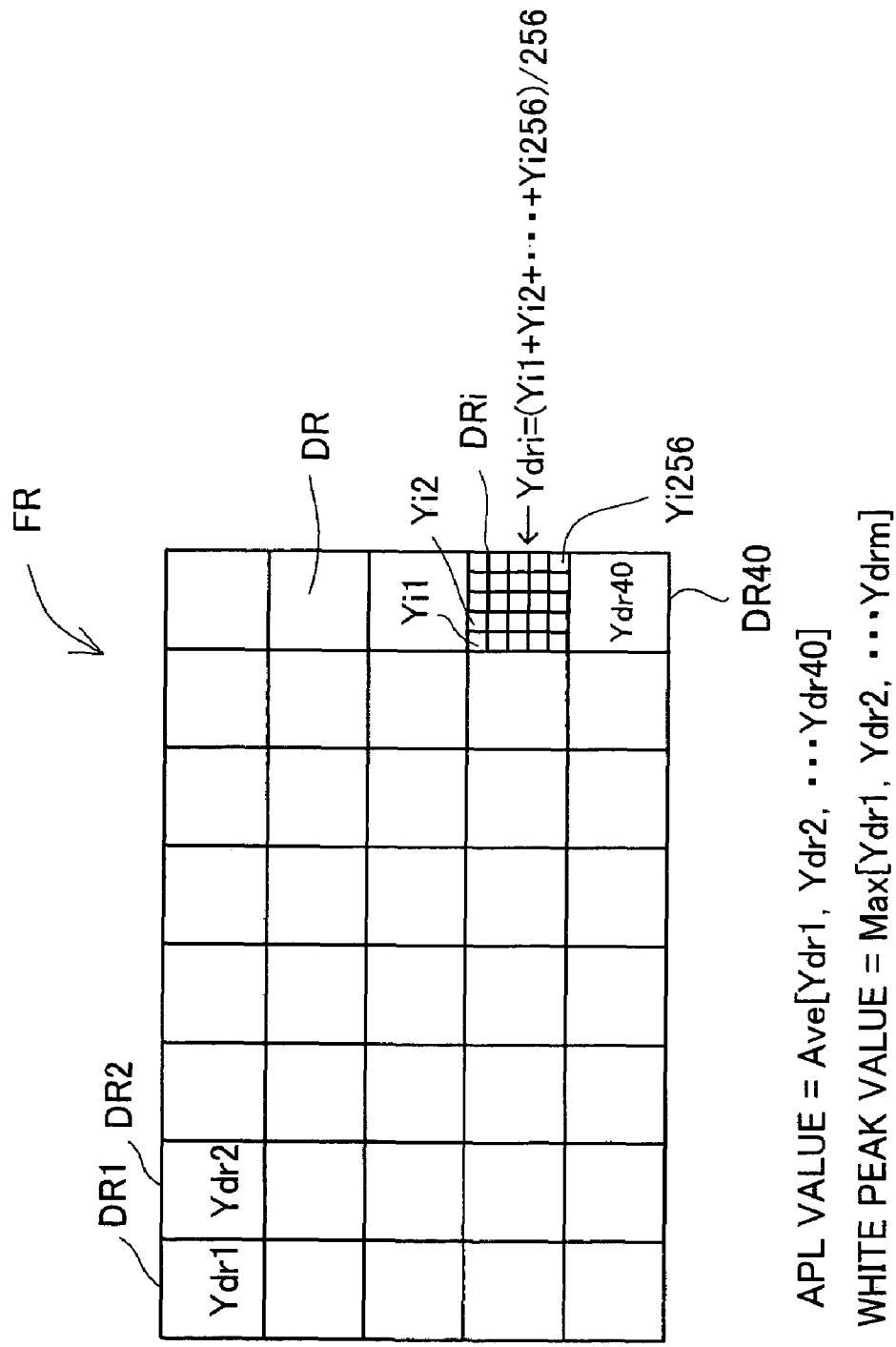
FIG. 2 shows processing executed by an image feature amount calculation module 100.

FIG. 2 shows the processing executed by the image feature amount calculation module 100. The image feature amount calculation module 100 first divides one frame FR into a plurality of sub-regions DR each having a size of 16×16 pixels. While the sub-regions DRi in FIG. 2 are shown as containing only 25 pixels, in actuality each sub-region DRi contains 256 pixels. Furthermore, in the example of FIG. 2, the frame FR is divided into 40 sub-regions DR1-DR40. If the brightness of each pixel in a given $i^{th}$ sub-region DRi among these 40 sub-regions DR1-DR40 is expressed as Y1-Y256, the representative brightness value Ydri of the sub-region DRi is expressed using the following equation (3):

$$Ydri = (Yi1 + Yi2 + \ldots + Yi256)/256 \quad (3)$$

Namely, the representative brightness value Ydri of sub-region DRi is an average brightness value for all pixels included in the sub-region DRi. The image feature amount calculation module 100 determines representative brightness values Ydr1-Ydr40 for sub-regions DR1-DR40 using the equation (3). The module 100 then deems the average value of the representative brightness values Ydr1-Ydr40 to be the APL value and deems the maximum value of the representative brightness values Ydr1-Ydr40 to be the white peak value WP. In this embodiment, the APL value and white peak value WP are expressed as 10-bit values. The size and number of the sub-regions DR may be arbitrarily set.

Figure 3:
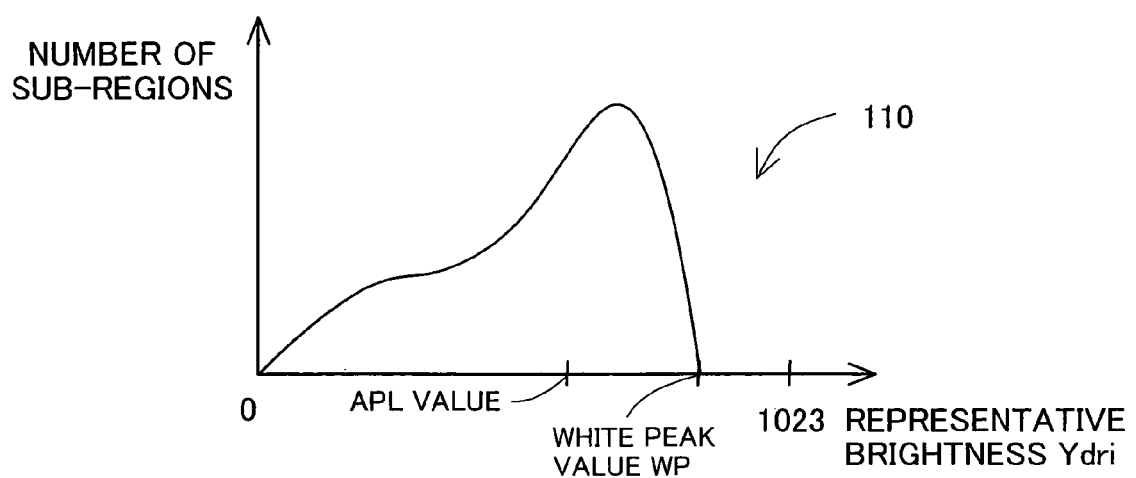
FIG. 3 shows a brightness histogram 110 for image data.

The image feature amount calculation module 100 further generates a brightness histogram for image data shown in FIG. 3. The horizontal axis in FIG. 3 represents the representative brightness value Ydri of sub-region DRi, while the vertical axis represents the number of sub-regions.

The expansion coefficient derivation module 200 uses the APL value and white peak value WP to derive an ideal expansion coefficient Gid(n) and corrected expansion coefficient G(n) with reference to the expansion coefficient LUT 210. Based on the ideal expansion coefficient Gid(n), the corrected expansion coefficient G(n) and the brightness histogram 110 generated by the image feature amount calculation module 100, the expansion coefficient output mode determination module 250 executes processing to determine an expansion coefficient output mode to be used. There are two expansion coefficient output modes: a scene change mode that continues from the time at which a prescribed start condition is satisfied until the time at which a prescribed stop condition is satisfied, and a normal mode that continues from the time at which the stop condition is satisfied until the time at which a prescribed start condition is satisfied. The start and stop conditions are described in detail below. If the expansion coefficient output mode is the scene change mode, the expansion coefficient derivation module 200 outputs the ideal expansion coefficient Gid(n), while if the expansion coefficient output mode is the normal mode, the module 200 outputs the corrected expansion coefficient G(n).

Figure 4:
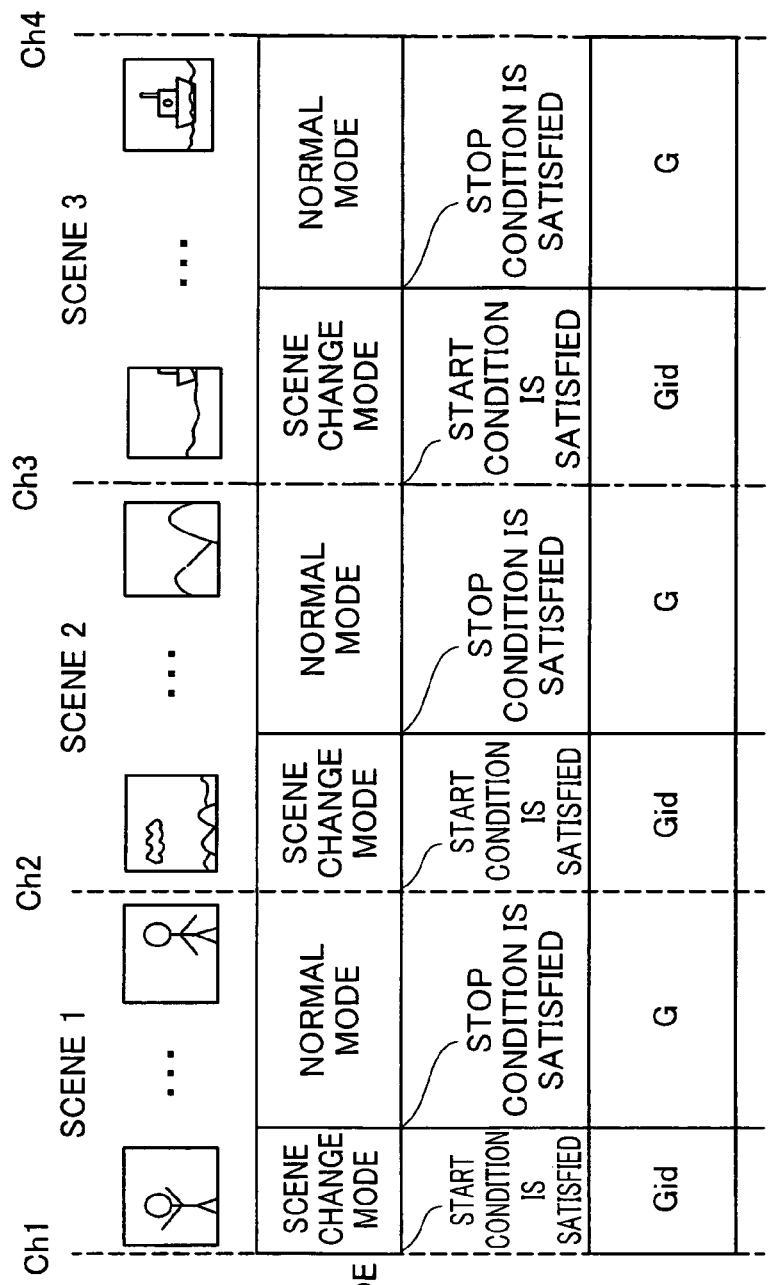
FIGS. 4(a)-4(c) show the relationship between expansion coefficient output modes and expansion coefficients output by an expansion coefficient derivation module 200.

FIGS. 4(*a*)-4(*c*) show the relationship between the expansion coefficient output modes and the expansion coefficients output by the expansion coefficient derivation module 200. FIG. 4(*a*) shows the images for each frame of moving image data in time sequence. In the images of FIG. 4(*a*), the images change substantially at scene change lines Ch1-Ch4. FIG. 4(*b*) shows the expansion coefficient output modes for the images shown in FIG. 4(*a*), the output modes being determined by the expansion coefficient output mode determination module 250. If the moving images undergo a scene change, a start condition becomes satisfied. When this start condition becomes satisfied, the expansion coefficient output mode determination module 250 sets the expansion coefficient output mode to the scene change mode. In addition, if the stop condition becomes satisfied while the expansion coefficient output mode is the scene change mode, the module 250 sets the expansion coefficient output mode to the normal mode.

FIG. 4(*c*) shows the types of the expansion coefficients output from the expansion coefficient derivation module 200 according to the expansion coefficient output mode. In FIG. 4(*c*), "Gid" indicates that the ideal expansion coefficient is output, and "G" indicates that the corrected expansion coefficient is output. Namely, in FIG. 4(*c*), it is shown that the ideal expansion coefficient Gid(n) is output during the period that the expansion coefficient output mode is set to the scene change mode, while the corrected expansion coefficient G(n) is output during the period that the expansion coefficient output mode is set to the normal mode.

Figure 5:
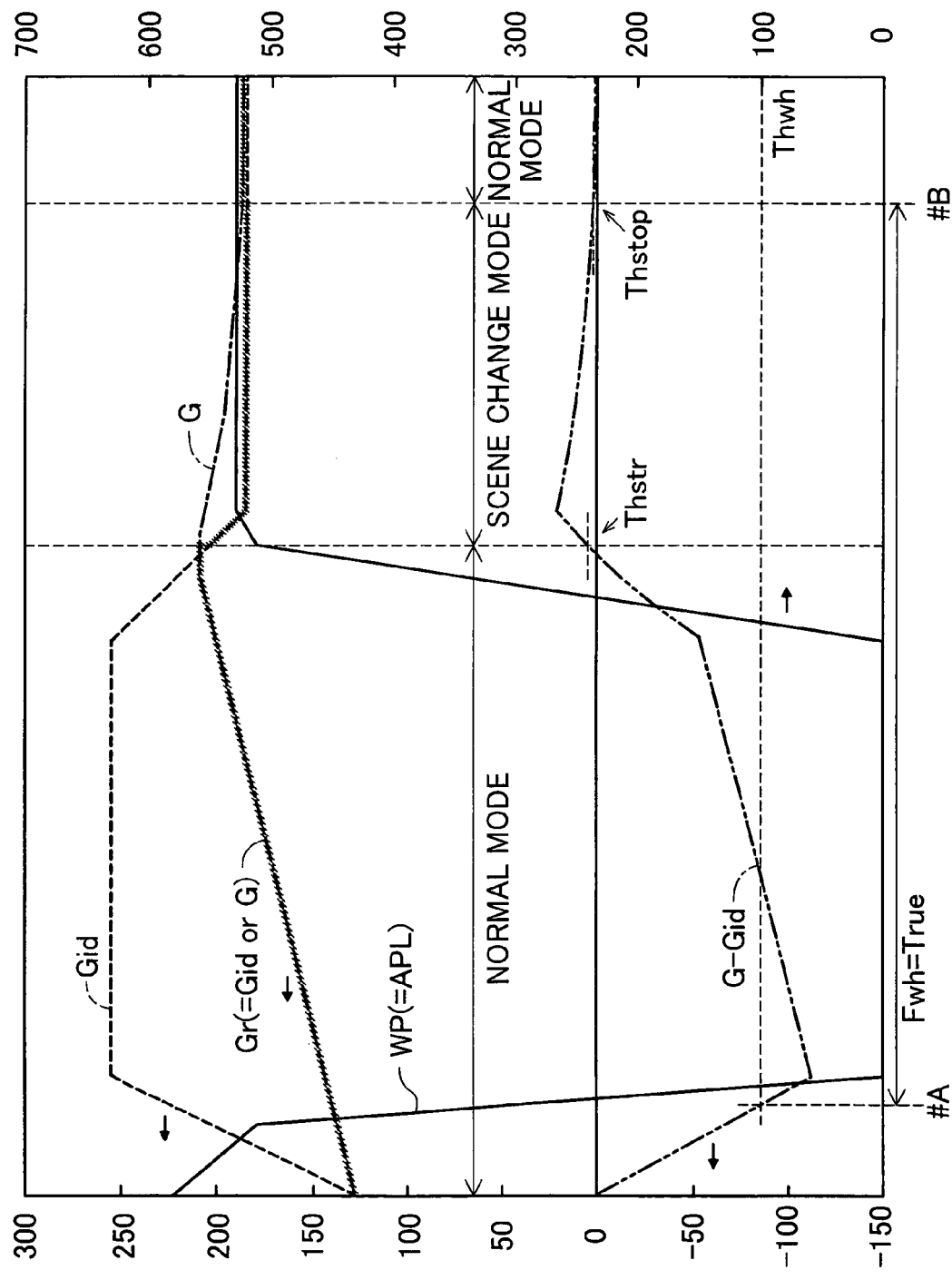
FIG. 5 shows changes in the expansion coefficients.

FIG. 5 shows changes in the expansion coefficients. In FIG. 5, changes in the image brightness (white peak value WP), the ideal expansion coefficient "Gid", the corrected expansion coefficient "G" and the difference between the two expansion coefficients "G-Gid" are shown. Furthermore, changes in an actual expansion coefficient "Gr" output by the expansion coefficient derivation module 200 are shown. The actual expansion coefficient Gr is indicated by applying hatch marks to one of the two expansion coefficients G, Gid. During normal mode, the actual expansion coefficient Gr matches the corrected expansion coefficient G, while during scene change mode, the actual expansion coefficient Gr matches the ideal expansion coefficient Gid. WP is drawn using the vertical axis at the right side of the drawing, while Gid, G, G-Gid and Gr are drawn using the vertical axis at the left side of the drawing.

In FIG. 5, the image brightness of each frame is expressed by the white peak value WP, and the white peak value WP is equal to the APL value. Namely, it is assumed that the image of each frame is a uniform solid image. The two expansion coefficients Gid, G change according to changes in the image brightness. However, as shown in FIG. 5, the ideal expansion coefficient Gid changes simultaneously with the change of the image brightness, while the corrected expansion coefficient G changes after the change of the image brightness. In other words, if the ideal expansion coefficient Gid is used, the expansion ratio used for brightness range expansion processing can be changed in response to sudden changes in the image brightness. On the other hand, if the corrected expansion coefficient G is used, while the expansion ratio is not changed in response to sudden changes in the image brightness, sudden changes in the expansion ratio can be suppressed. The processing executed in this embodiment will be described below with reference to FIG. 5.

Figure 6:
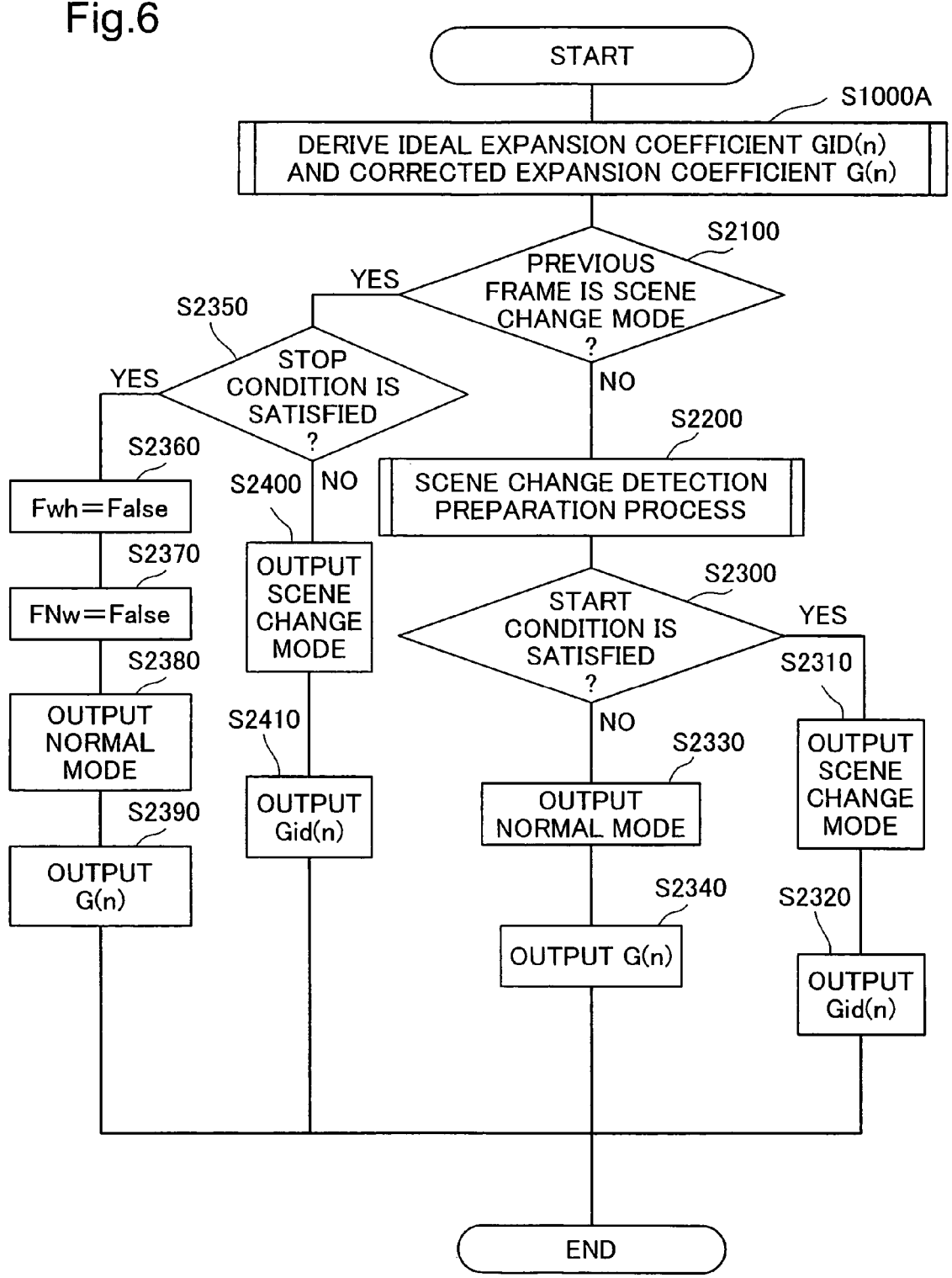
FIG. 6 is a flow chart showing processing executed by the expansion coefficient derivation module 200 and expansion coefficient output mode determination module 250.

FIG. 6 is a flow chart showing the processing executed by the expansion coefficient derivation module 200 and the expansion coefficient output mode determination module 250. First, the expansion coefficient derivation module 200 derives the ideal expansion coefficient Gid(n) and the corrected expansion coefficient G(n) (step S1000A). The derivation of the coefficients Gid(n), G(n) is described in detail below. If the expansion coefficient output mode for the previous frame is not the scene change mode (NO in step S2100), the expansion coefficient output mode determination module 250 executes scene change detection preparation process (step S2200).

Figure 7:
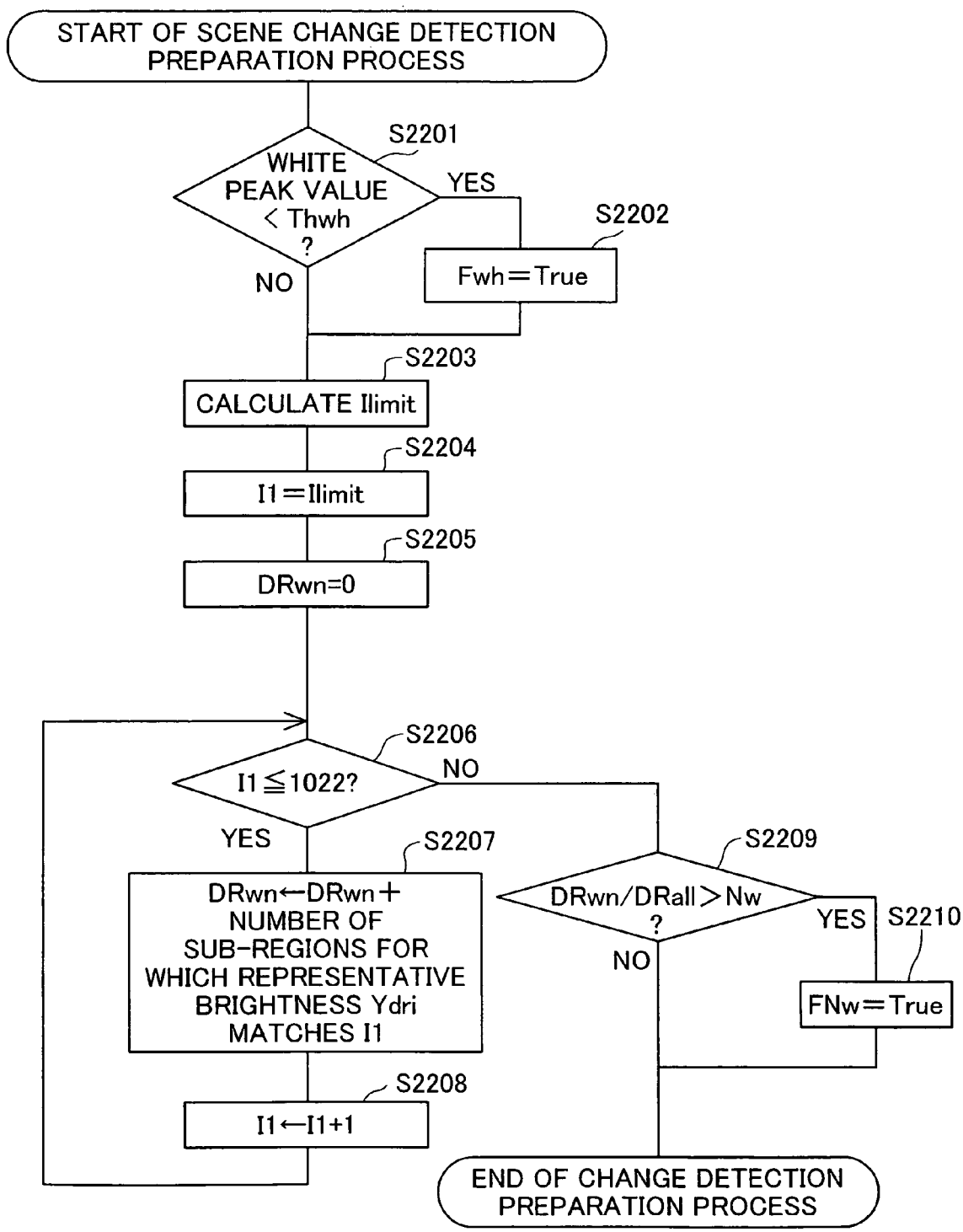
FIG. 7 is a flow chart showing scene change detection preparation process.
Figure 8:
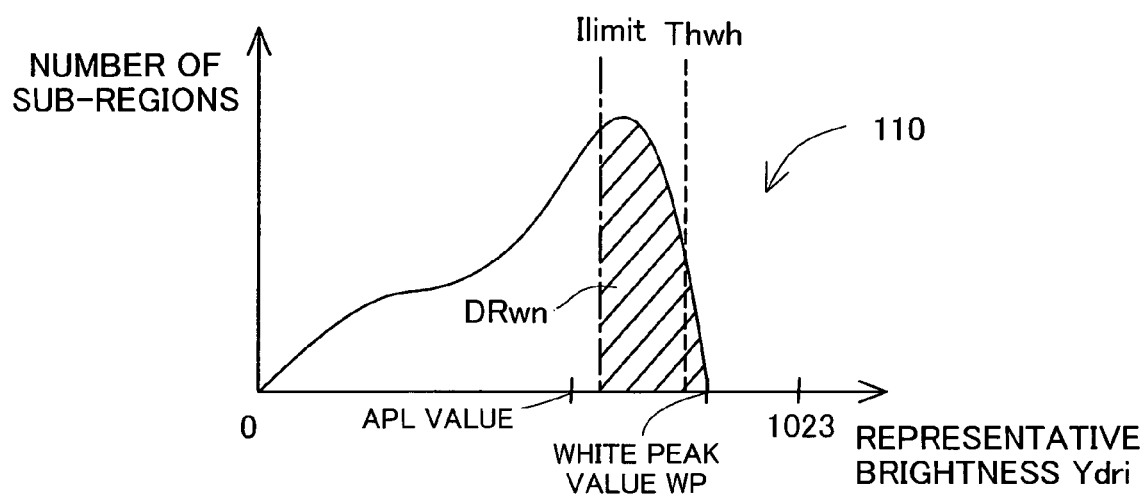
FIG. 8 shows the operation of the scene change detection preparation process.

FIG. 7 is a flow chart showing the scene change detection preparation process. The expansion coefficient output mode determination module 250 determines whether or not the white peak value WP representing the maximum brightness value within the brightness histogram 110 is smaller than a white peak threshold value Thwh (step S2201). FIG. 8 shows the operation of the scene change detection preparation process. The brightness histogram 110 in FIG. 8 is the same as the brightness histogram 110 in FIG. 3. In the example of FIG. 8, because the white peak value WP is larger than the white peak threshold value Thwh indicated by the dashed line, the result of "NO" is obtained in step S2201. If the white peak value WP is smaller than the white peak threshold value Thwh, the expansion coefficient output mode determination module 250 changes a white peak flag Fwh from the initial value of "False" to the value of "True" (step S2202).

The expansion coefficient output mode determination module 250 then calculates the brightness limit value using the following equations (4) and (5) (step S2203). K1 in equation (5) is an expansion ratio.

$$Ilimit = 1023/K1 \quad (4)$$

$$K1 = 1 + G(n)/255 \quad (5)$$

The brightness limit value Ilimit indicates a specific brightness that becomes to the maximum brightness of 1023, if brightness range expansion processing is performed to the specific brightness using the corrected expansion coefficient G(n). When brightness range expansion processing is performed using the corrected expansion coefficient G(n) to a sub-region DRi for which the brightness prior to brightness range expansion processing equals or exceeds the brightness limit value Ilimit, the representative brightness value Ydri for the sub-region DRi becomes equal to or exceeds the maximum brightness of 1023. As a result, the phenomenon of "whiteout" (that is, flashing highlight) occurs, in which the image of the sub-region DRi becomes white. In the steps S2204-S2208 below, a value of DRwn representing the number of sub-regions having a representative brightness Ydri that equals or exceeds the brightness limit value Ilimit but does not exceed 1022 is calculated. In other words, the number of sub-regions that would experience whiteout if brightness range expansion processing were carried out thereto using the corrected expansion coefficient G(n) is calculated. Such value is hereinafter termed "the number of white-side sub-regions DRwn". In FIG. 8, the brightness limit value Ilimit is indicated by a chain-dot line, the number of white-side sub-regions DRwn corresponds to the area shaded by diagonal lines.

Specifically, the brightness limit value Ilimit is substituted for a variable I1 (step S2204) and "0" is substituted for the number of white-side sub-regions DRwn in order to initialize the number DRwn (step S2205). If the variable I1 is equal to or smaller than 1022 (YES in step S2206), the number of sub-regions DRi whose representative brightness Ydri matches the variable I1 is added to the number of white-side sub-regions DRwn (step S2207). The variable I1 is then incremented upward by 1 (step S2208) and the operations of steps S2206 and S2207 are repeated. If the variable I1 becomes larger than 1022 after being incremented in step S2208 (NO in step S2206), the number of white-side sub-regions DRwn at that time is determined to be the final number of white-side sub-regions DRwn. The expansion coefficient output mode determination module 250 then determines whether or not the ratio of the number of white-side sub-regions DRwn to all sub-regions DRall is larger than a white-side threshold value Nw (step S2209). If this ratio is larger than the value Nw (YES in step S2209), the white-side sub-region flag FNw is changed from the initial value of "False" to the value of "True" (step S2210). In this embodiment, the number of sub-regions DRi whose representative brightness value Ydri is 1023 is not added to the number of white-side sub-regions DRwn because these sub-regions are not regions that would experience whiteout if brightness range expansion processing were carried out thereto using the corrected expansion coefficient G(n), but are rather regions that will experience whiteout even if brightness range expansion processing using the corrected expansion coefficient G(n) is not performed thereto. However, alternatively, the number of sub-regions DRi whose representative brightness value Ydri is 1023 may be added to the number of white-side sub-regions DRwn.

Next, the expansion coefficient output mode determination module 250 determines whether or not either of the start conditions 1 and 2 below is satisfied (step S2300 in FIG. 6).

Start condition 1: The white peak flag Fwh is "True" and the difference G(n)−Gi(n) is larger than the start threshold value Thstr Start condition 2: The white-side sub-region flag FNw is "True"

The start condition 1 is established according to the following consideration. As described above, the white peak flag Fwh is set to "True" if the white peak value WP for a specific frame is smaller than the white peak threshold value Thwh (step S2202 in FIG. 7). The white peak flag Fwh is then maintained until step S2360 in FIG. 7 described below is executed. Because the white peak threshold value Thwh is a sufficiently small value, the white peak value WP being "True" means that the image of the specific frame is extremely dark. Because a black screen is often inserted when a scene change occurs, if the condition that the white peak flag Fwh for the frame prior to the current frame has a value of "True" is satisfied, it is determined that a scene change is occurring, and the expansion coefficient output mode can be set to the scene change mode. In FIG. 5, the white peak flag Fwh is set to "True" for the frame #A. However, as can be seen from FIG. 5, if the difference G(n)−Gi(n) is equal to or smaller than the start threshold value Thstr, whiteout is unlikely to occur because the corrected expansion coefficient G(n) is slightly larger than the ideal expansion coefficient Gid(n), or whiteout does not occur because the corrected expansion coefficient G(n) is smaller than the ideal expansion coefficient Gid(n). Therefore, the normal mode may be safely determined, in which the corrected expansion coefficient G(n) is output. Accordingly, in this embodiment, if the white peak flag Fwh is "True" and the difference G(n)−Gid(n) is larger than the start threshold value Thstr, i.e., if the start condition 1 described above is satisfied, the expansion coefficient output mode is changed to the scene change mode. Alternatively, the expansion coefficient output mode is changed to the scene change mode if the white peak flag Fwh is "True".

The white-side sub-region flag FNw used in connection with the start condition 2 is set to "True" if the ratio of the number of white-side sub-regions DRwn to all sub-regions DRall is larger than the white-side threshold value Nw. The white-side sub-region flag FNw being "True" means that whiteout could easily occur if brightness range expansion processing were performed using the corrected expansion coefficient G(n). As can be seen from FIG. 5, the ideal expansion coefficient Gid(n) changes simultaneously with the change of the image brightness, but the corrected expansion coefficient G(n) changes after the change of the image brightness. Consequently, if brightness range expansion processing were carried out using the corrected expansion coefficient G(n), whiteout could occur in the current frame due to an inability to respond to a sudden change from a fairly dark image to a bright image. More specifically, if the white peak flag Fwh were not changed to "True" as a result of the fairly dark image of the frame prior to the current frame and the brightness range expansion processing were carried out to the bright image of the current frame image using the corrected expansion coefficient G(n), whiteout could occur in the current frame. Therefore, in this embodiment, if the start condition 2 is satisfied, it is determined that a scene change is occurring, and the expansion coefficient output mode is set to the scene change mode. The start condition 2 may be satisfied even if the previous frame is a black image and the start condition 1 is not satisfied.

If either of the start conditions 1 or 2 is satisfied, the expansion coefficient output mode determination module 250 sets the expansion coefficient output mode to the scene change mode and outputs this mode to the expansion coefficient derivation module 200 (step S2310). Since the expansion coefficient output mode is the scene change mode, the expansion coefficient derivation module 200 outputs the ideal expansion coefficient Gid(n) (step S2320). If neither of the start conditions 1 or 2 is satisfied, the mode determination module 250 sets the expansion coefficient output mode to the normal mode and outputs this mode to the derivation module 200 (step S2330). Since the expansion coefficient output mode is the normal mode, the derivation module 200 outputs the corrected expansion coefficient G (n) (step S2340).

On the other hand, if the expansion coefficient output mode for the previous frame is the scene change mode (YES in step S2100), it is determined whether or not either of the stop conditions below is satisfied (step S2350), and if either of such conditions is satisfied, the expansion coefficient output mode is changed from the scene change mode to the normal mode.

Stop condition 1: The difference G(n)−Gid(n) is smaller than the stop threshold value Thstop Stop condition 2: Gid(n)>Gid(n−1)

Regarding the stop condition 1, the difference G(n)−Gid(n) being smaller than the stop threshold value Thstop means that the difference between the corrected expansion coefficient G(n) and the ideal expansion coefficient Gid(n) is sufficiently small, as can be seen from FIG. 5. In this case, because the likelihood of a problem occurring is small even if the corrected expansion coefficient G(n) is output rather than the ideal expansion coefficient Gid(n), the expansion coefficient output mode is changed to the normal mode in which the corrected expansion coefficient G(n) is output.

Regarding the stop condition 2, the current-frame ideal expansion coefficient Gid(n) being larger than the previous-frame ideal expansion coefficient Gid(n−1) means that the current-frame image is darker than the previous-frame image. Because it often occurs during a scene change that the image becomes dark at first and then gradually becomes bright, if the current-frame image is darker than the previous-frame image, it may be assumed that the image brightness of the current frame becomes standard brightness. Furthermore, because the current-frame image being dark means that the possibility of whiteout occurring is low, it is unlikely that a problem will arise even if the corrected expansion coefficient G(n) is output. Therefore, if the start condition 2 is satisfied, the expansion coefficient output mode is changed to the normal mode in which the corrected expansion coefficient G(n) is output rather than the ideal expansion coefficient Gid(n). In FIG. 5, when a scene change occurs, the ideal expansion coefficient Gid increases at first and then gradually declines. In other words, FIG. 5 indicates that when a scene change occurs, the image becomes dark at first and then gradually becomes bright.

If either of the stop conditions 1 or 2 is satisfied, the expansion coefficient output mode determination module 250 sets the white peak flag Fwh to "False" (step S2360), sets the white-side sub-region flag FNw to "False" (step S2370), and sets the expansion coefficient output mode to the normal mode and outputs this mode to the expansion coefficient derivation module 200 (step S2380). Since the expansion coefficient output mode is the normal mode, the expansion coefficient derivation module 200 outputs the corrected expansion coefficient G(n) (step S2390). If neither of the stop conditions 1 or 2 is satisfied, the mode determination module 250 sets the expansion coefficient output mode to the scene change mode and outputs this mode to the derivation module 200 (step S2400). Since the expansion coefficient output mode is the scene change mode, the derivation module 200 outputs the ideal expansion coefficient Gid(n) (step S2410). In FIG. 5, the stop condition 1 is satisfied, and the white peak flag Fwh is set to "False" for the frame #B.

Figure 9:
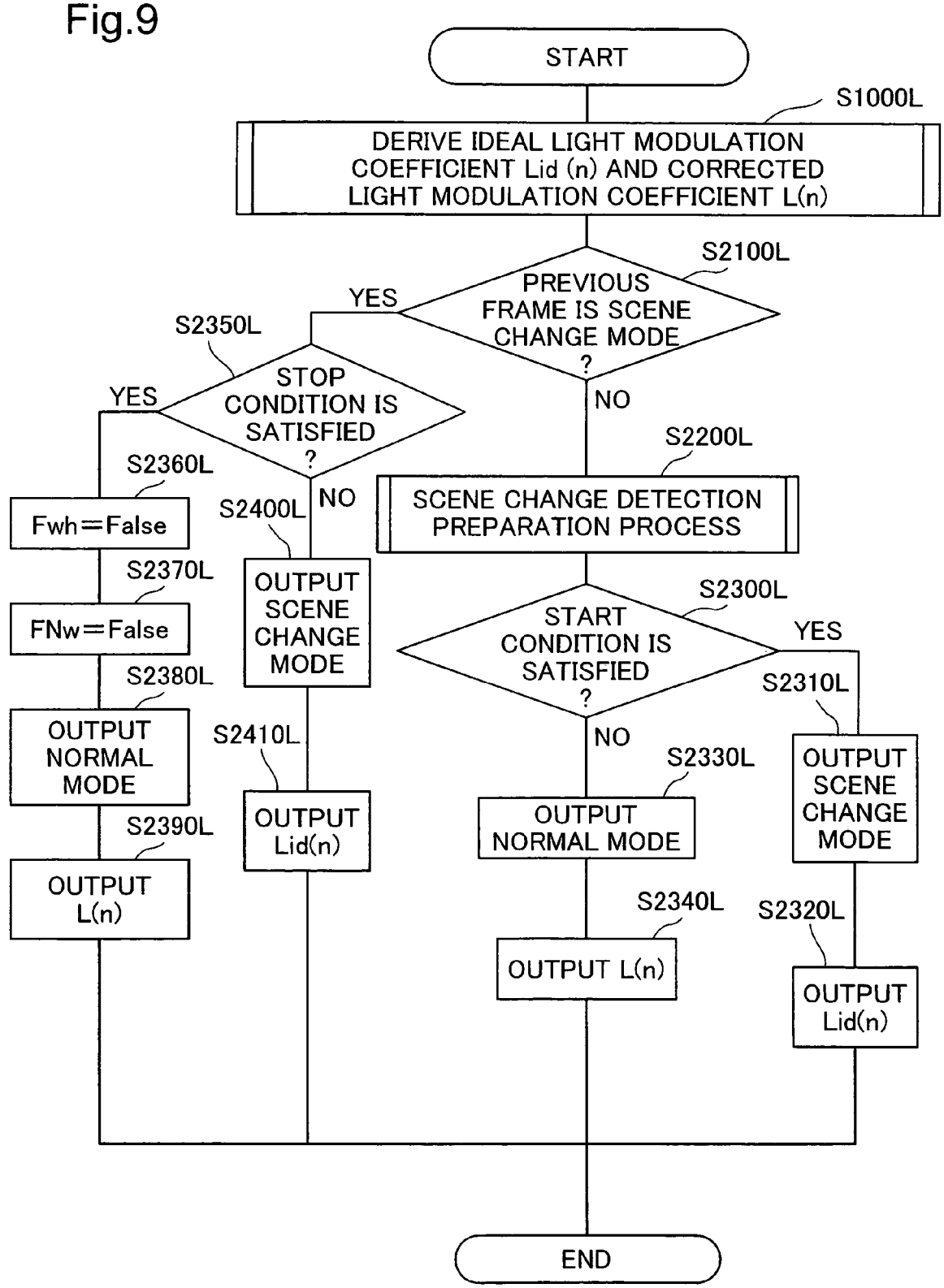
FIG. 9 is a flow chart showing processing performed by a light modulation coefficient derivation module 500 and a light modulation coefficient output mode determination module 550.

FIG. 9 is a flow chart showing the processing performed by the light modulation coefficient derivation module 500 and the light modulation coefficient output mode determination module 550. As can be seen from a comparison of FIGS. 6 and 9, the flow chart of FIG. 9 is similar to that of FIG. 6, the letter "G" regarding the expansion coefficient is replaced by "L" regarding the light modulation coefficient. Since the processing executed by the derivation module 500 and mode determination module 550 is similar to that executed by the derivation module 200 and mode determination module 250, detail description is omitted. However, the start and stop conditions for light modulation are as follows.

Scene change start condition 1 for light modulation:
The white peak flag Fwh is "True"
Scene change stop condition 1 for light modulation:
Difference L(n)−Lid(n) is smaller than the stop threshold value Thstop
Scene change stop condition 2 for light modulation:
Lid(n)<Lid(n−1)

Regarding light modulation, since a start condition pertaining to the white-side sub-region flag FNw is not present, the operations of steps S2203-S2210 of the scene change detection preparation process shown in FIG. 7 may be omitted.

The above start and stop conditions may be set in various ways. For example, the scene change stop condition 2 for light modulation may be as follows.

Scene change stop condition 2 for light modulation:
Lid(n)>Lid(n−1)

In this embodiment, the expansion coefficient output mode determination module 250 and the light modulation coefficient output mode determination module 550 are separate components, and each performs mode determination on its own. But either the mode determination module 250 or mode determination module 550 may be omitted and the expansion coefficient derivation module 200 and light modulation coefficient derivation module 500 both may obey the mode determination output by the remaining mode determination module. Alternatively, it is acceptable if there is only one mode determination module, the stop conditions are as shown below, and the expansion coefficient output mode and light modulation coefficient output mode are both set to the normal mode where at least one of the stop conditions 1-4 is satisfied.

Stop condition 1: The difference G(n)−Gid(n) is smaller than the threshold Thstop
Stop condition 2: Gid(n)>Gid(n−1)
Stop condition 3: The difference L(n)−Lid(n) is smaller than the threshold Thstop
Stop condition 4: Lid(n)>Lid(n−1)

Figure 10:
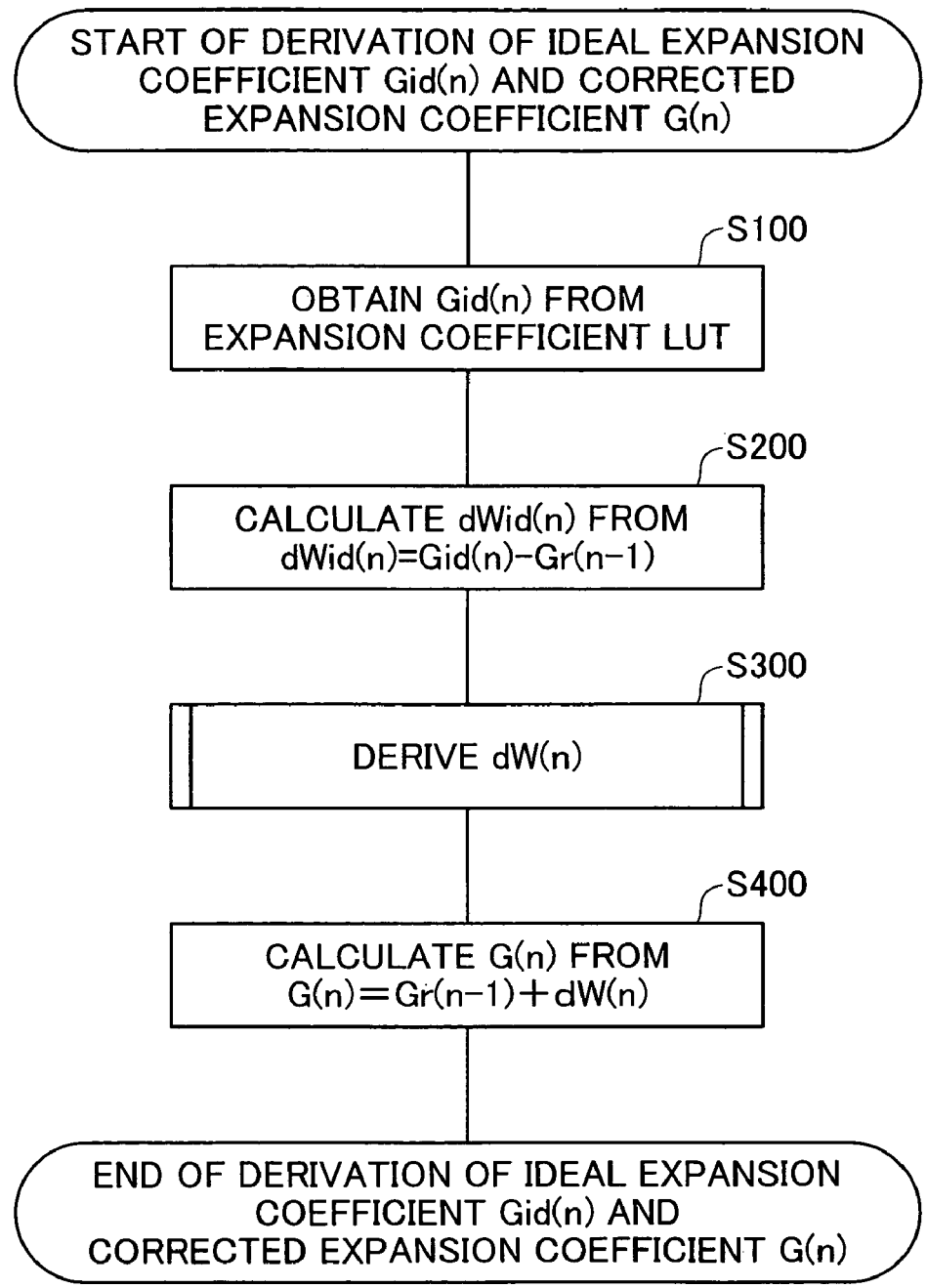
FIG. 10 is a flow chart showing derivation process to obtain ideal expansion coefficient Gid(n) and corrected expansion coefficient G(n)

A-2. Calculation of Expansion Coefficient:

The process by which the expansion coefficient derivation module 200 determines the ideal expansion coefficient Gid(n) and the corrected expansion coefficient G(n) (step S1000A in FIG. 6) will now be described. FIG. 10 is a flow chart showing derivation process to obtain the ideal expansion coefficient Gid(n) and corrected expansion coefficient G(n). First, the expansion coefficient derivation module 200 obtains the ideal expansion coefficient Gid(n) from the expansion coefficient LUT 210 (step S100).

Figure 11:
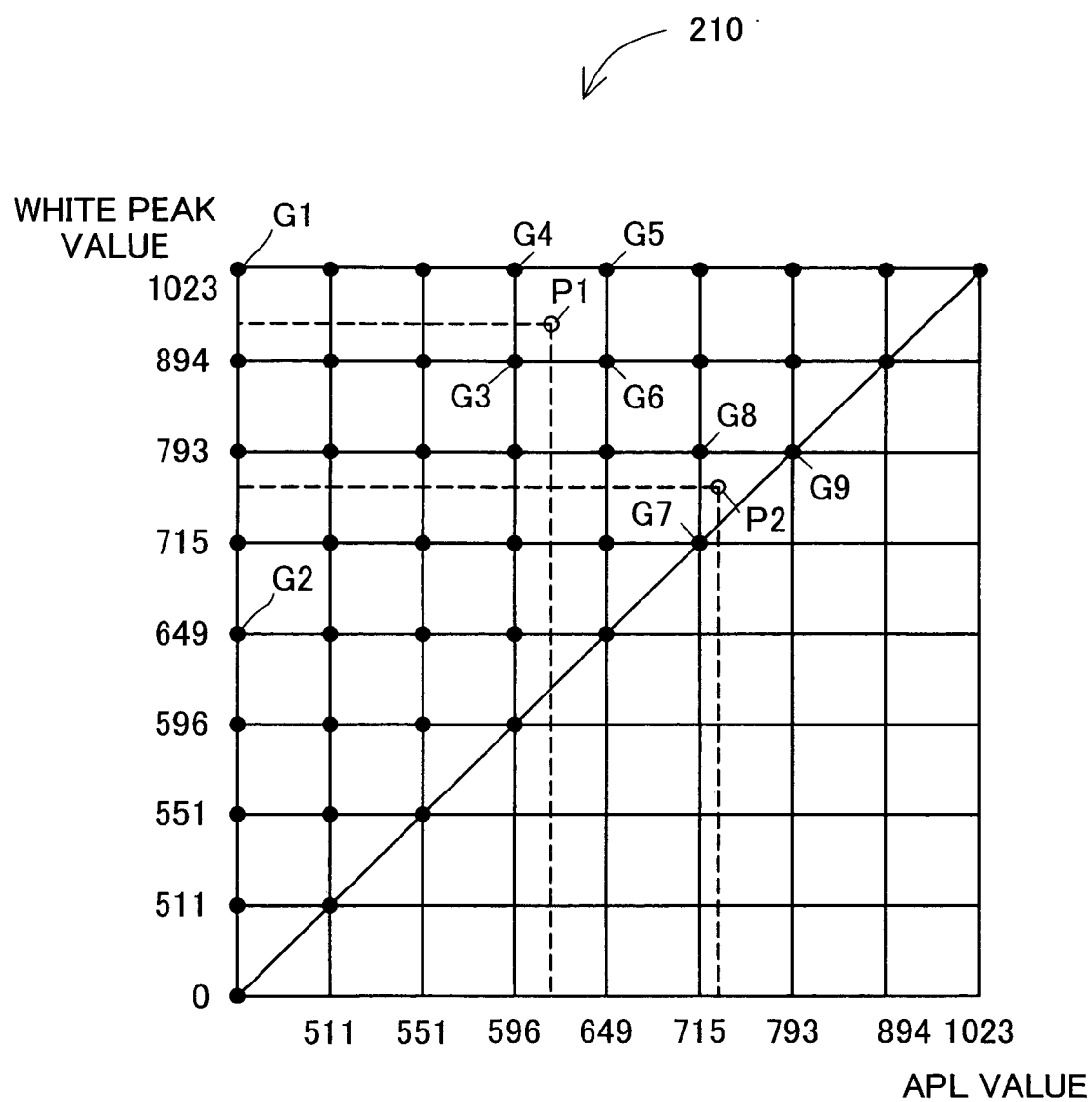
FIG. 11 shows an example of input lattice points of an expansion coefficient LUT 210.

FIG. 11 shows an example of the input lattice points of the expansion coefficient LUT 210. The horizontal axis in FIG. 11 represents the APL value, while the vertical axis represents the white peak value WP. The ideal expansion coefficient Gid(n) is stored at each input lattice point indicated by a black circle in FIG. 11. A lattice point having a specific white peak value WP and a relatively large APL value (e.g. lattice point G6) stores an ideal expansion coefficient Gid(n) that is smaller than an ideal expansion coefficient Gid(n) stored in a lattice point having the same specific white peak value WP and a relatively small APL value (e.g. lattice point G3). However, lattice points whose white peak value WP is 1023 stores an ideal expansion coefficient Gid(n) of 0. Furthermore, a lattice point having a specific APL value and a relatively large white peak value WP (e.g. lattice point G8) stores an ideal expansion coefficient Gid(n) that is smaller than an ideal expansion coefficient Gid(n) stored in a lattice point having the same specific APL value and a relatively small white peak value WP (e.g. lattice point G7). For example, an ideal expansion coefficient Gid(n) of 0 is stored in the input lattice point G1, while an ideal expansion coefficient Gid(n) of 148 is stored in the input lattice point G2. In addition, a lattice point having a value of 0 for both the white peak value WP and the APL value stores an ideal expansion coefficient Gid(n) of the maximum value (e.g. 255). Because the APL value never exceeds the white peak value WP, there are no ideal expansion coefficient Gid(n) values stored in the input lattice points at the bottom right half of the expansion coefficient LUT 210, enabling the capacity of memory used for the expansion coefficient LUT 210 to be reduced. The range of values used for the ideal expansion coefficient Gid(n) may be arbitrarily set, and may be set to a range of 0-255, for example.

If the combination of the APL value and the white peak value WP for image data matches one of the input lattice points (black circles) in FIG. 11, the expansion coefficient derivation module 200 reads and uses the ideal expansion coefficient Gid(n) for that input lattice point as is. If the combination of the APL value and the white peak value WP for image data does not match an input lattice point, for example in the case of the coordinate points P1 and P2, the ideal expansion coefficient Gid(n) is determined by interpolation. One of two types of interpolation may be performed: either (1) four-point interpolation, which is carried out when the target point, such as the coordinate point P1, is surrounded by four input lattice points, such as the input lattice points G3-G6, or (2) three-point interpolation, which is carried out when the target point, such as the coordinate point P2, is surrounded by three input lattice points, such as the lattice points G7-G9.

Figure 12A:
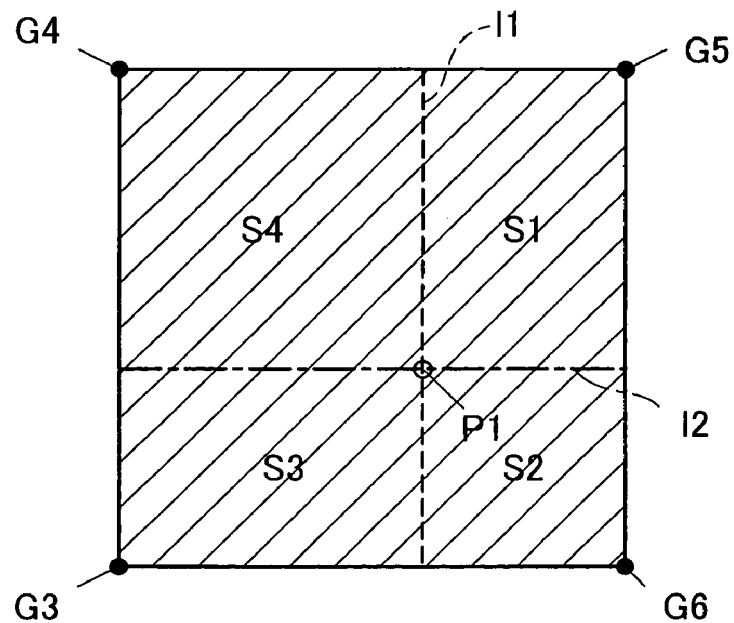
FIGS. 12(a) and 12(b) show process of interpolation.
Figure 12B:
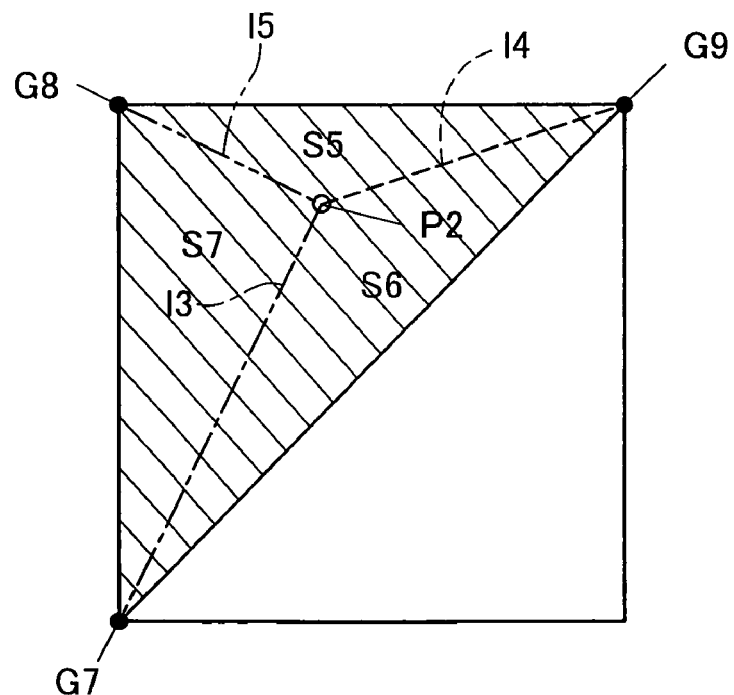

FIGS. 12(a) and 12(b) show the process of interpolation. FIG. 12(a) shows four-point interpolation, while FIG. 12(b) shows three-point interpolation. The ideal expansion coefficient values for the input lattice points G3-G9 are respectively expressed as Gv3-Gv9 in the discussion below. If the areas S1-S4 in FIG. 12(a) are deemed the areas of regions obtained by dividing the square formed by the input lattice points G3-G9 using the horizontal and vertical line segments 11, 12 that travel through the coordinate point P1 and the area S is deemed the total area of the region shaded using diagonal lines, the ideal expansion coefficient Gp1 for the coordinate point P1 is calculated by the equation (6) below.

$$Gp1=(Gv3\times S1+Gv4\times S2+Gv5\times S3+Gv6\times S4)/S \qquad (6)$$

On the other hand, if the areas S5-S7 in FIG. 12(b) are deemed the areas of regions obtained by dividing the triangle formed by the input lattice points G7-G9 using the line segments 13-15 respectively having an end-point of the coordinate point P2 and the area Ss is deemed the total area of the region shaded using diagonal lines, the ideal expansion coefficient Gp2 for the coordinate point P2 is calculated by the equation (7) below.

$$Gp2=(Gv7\times S5+Gv8\times S6+Gv9\times S7)/Sa \qquad (7)$$

The ideal expansion coefficient Gid(n) is determined in the manner described above (step S100 in FIG. 10).

The expansion coefficient derivation module 200 then determines an ideal change amount dWid(n) representing the difference between the ideal expansion coefficient Gid(n) and the previous-frame actual expansion coefficient Gr(n−1) by the equation (8) below.

$$dWid(n)=Gid(n)-Gr(n-1) \qquad (8)$$

The ideal change amount dWid(n) is equivalent to the amount of variation between the ideal expansion coefficient Gid(n) and the previous-frame actual expansion coefficient Gr(n−1). The ideal change amount dWid(n) corresponds to the ideal expansion coefficient difference of the present invention.

Next, the expansion coefficient derivation module 200 determines a corrected change amount dW(n) from the ideal change amount dWid(n) (step S300). The corrected change amount dW(n) is the difference between the corrected expansion coefficient G(n) and the previous-frame actual expansion coefficient Gr(n−1). In other words, the relationship shown in the equation (9) is established.

$$dWn=G(n)-Gr(n-1) \qquad (9)$$

When this corrected change amount dW(n) is obtained, the corrected expansion coefficient G(n) is obtained. The corrected change amount dW(n) corresponds to the corrected expansion coefficient difference of the present invention.

Figure 13:
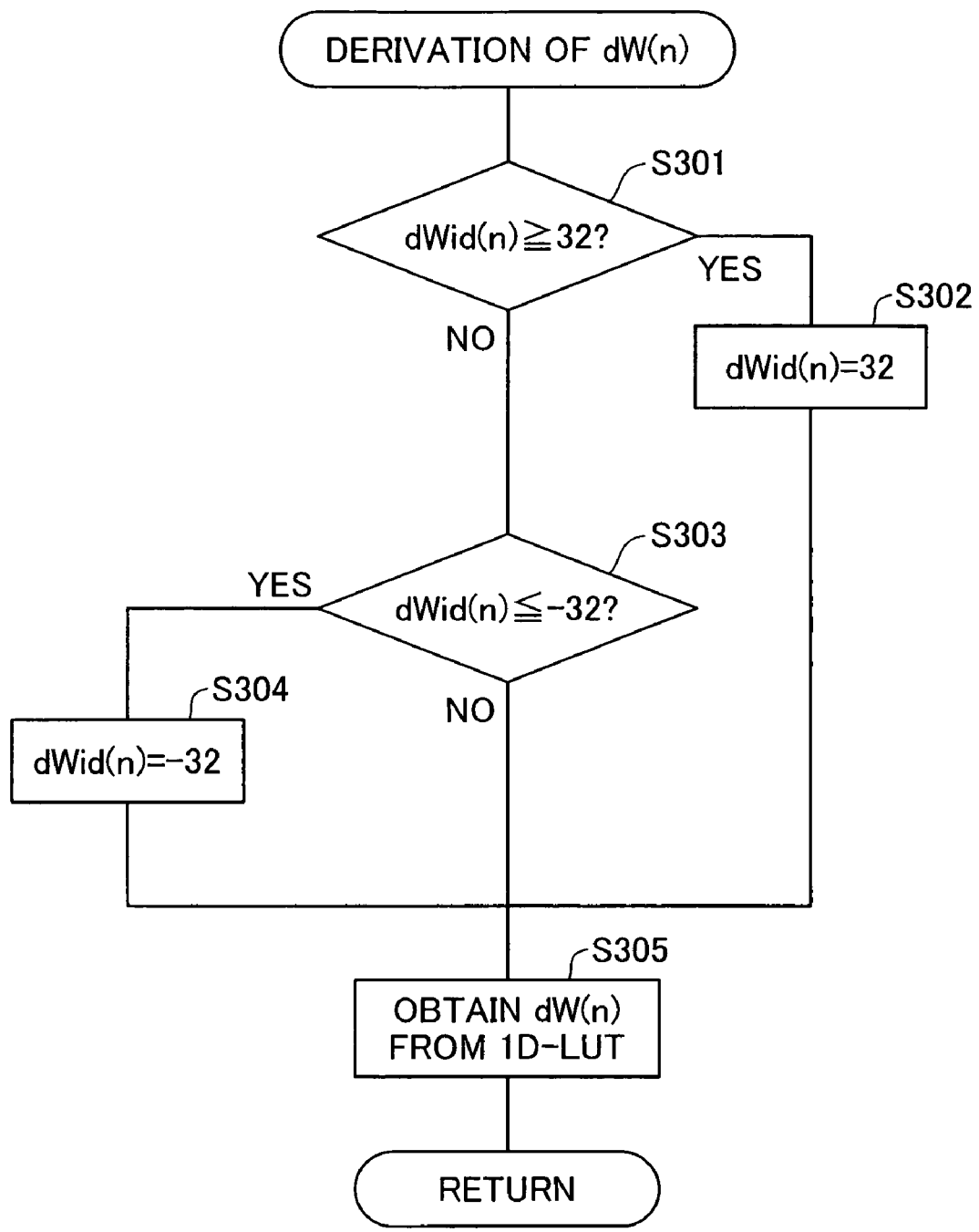
FIG. 13 is a flow chart showing derivation process to obtain corrected change amount dW(n)

FIG. 13 is a flow chart showing derivation process to obtain the corrected change amount dW(n). If the ideal change amount dWid(n) is 32 or larger (YES in step S301), the expansion coefficient derivation module 200 replaces the ideal change amount dWid(n) with "32" (step S302). If the ideal change amount dWid(n) is "−32" or smaller (YES in step S303), the derivation module 200 replaces the ideal change amount dWid(n) with "−32" (step S304). The ideal change amount dWid(n) is clipped in this way in order to enable it to fit within the input range of the one-dimensional (hereinafter "1D-") LUT 220 used to derive the corrected change amount dW(n). The 1D-LUT 220 outputs the corrected change amount dW(n) in accordance with the clipped ideal change amount dWid(n) (step S305).

Figure 14:
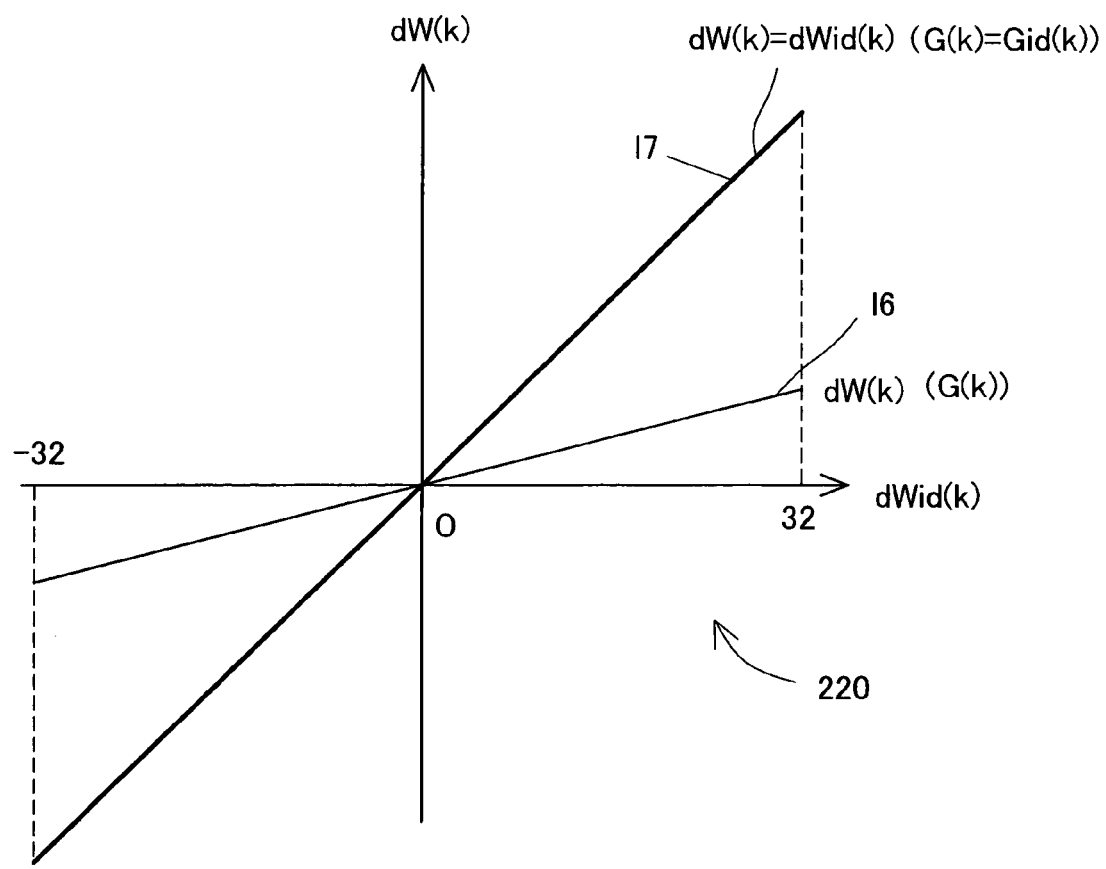
FIG. 14 shows input/output relationship of the 1D-LUT 220, the horizontal axis representing ideal change amount dWid(k) and the vertical axis representing corrected change amount dW(k)

FIG. 14 shows the input/output relationship of the 1D-LUT 220. In the drawing, the horizontal axis represents the ideal change amount dWid(k), while the vertical axis represents the corrected change amount dW(k). Here, "k" is an arbitral positive integer. The straight line 16 shows the relationship between the ideal change amount dWid(k) and the corrected change amount dW(k). The expansion coefficient derivation module 200 derives the corrected change amount dW(n) from the ideal change amount dWid(n) using this straight line 16.

The expansion coefficient derivation module 200 then determines the corrected expansion coefficient G(n) by the equation (10), which is obtained by modifying the equation (9) (step S400 in FIG. 10).

$$G(n)=Gr(n-1)+dW(n) \qquad (10)$$

Note that, if the ideal change amount dWid(n) is 0, based on the straight line 16, the corrected change amount dW(n) is also 0, and the current-frame corrected expansion coefficient G(n) is equal to the previous-frame actual expansion coefficient Gr(n−1). Since the straight line 16 is used to determine the corrected expansion coefficient G(k), "G(k)" is shown in parentheses next to the straight line 16.

Incidentally, the straight line 17 in FIG. 14 is a straight line that shows the case where the corrected change amount dW(k) is equal to the ideal change amount dWid(k). If the corrected change amount dW(k) were determined using this straight line 17, because the corrected change amount dW(k) would be equal to the ideal change amount dWid(k), the corrected expansion coefficient G(k) would be equal to the ideal expansion coefficient Gid(k), as can be understood from the equations (8) and (9). This is represented in FIG. 14 by showing "G(k)=Gid(k)" in parentheses next to the straight line 17. In addition, it can be understood from the relationship between the straight lines 16 and 17 that the corrected change amount dW(k) is set in the 1D-LUT 220 to have the same sign as the ideal change amount dWid(k) but a smaller absolute value.

Because the corrected expansion coefficient G(n) is determined using the corrected change amount dW(n) having the same sign as the ideal change amount dWid(n) but a smaller absolute value, the difference between the corrected expansion coefficient G(n) and the previous-frame actual expansion coefficient Gr(n−1) is smaller than the difference between the ideal expansion coefficient Gid(n) and the previous-frame actual expansion coefficient Gr(n−1), as can be seen from the equations (8) and (9). Namely, when this corrected expansion coefficient G(n) is used, sudden changes in the expansion coefficient from the previous-frame actual expansion coefficient Gr(n−1) can be suppressed than when the ideal expansion coefficient Gid(n) is used.

For example, if either of the two inequality expressions (11), (12) below holds true, the previous-frame ideal expansion coefficient Gid(n−1) and the current-frame ideal expansion coefficient Gid(n) are substantially different from each other, with the previous-frame actual expansion coefficient Gr(n−1) located therebetween. If the expansion coefficient derivation module 200 were to output the ideal expansion coefficient Gid(n) in normal mode, flickering might occur in the image. Therefore, the expansion coefficient derivation module 200 output the corrected expansion coefficient G(n)

instead of the ideal expansion coefficient Gid(n) in normal mode, and as a result, flickering is suppressed.

$$Gid(n-1) > Gr(n-1) > Gid(n) \quad (11)$$

$$Gid(n-1) < Gr(n-1) < Gid(n) \quad (12)$$

Namely, in normal mode, it is preferred that the corrected expansion coefficient G(n) is used. On the other hand, when a scene change occurs, because the image data changes suddenly between frames, it is preferred that the ideal expansion coefficient Gid(n) capable of responding to sudden changes more effectively than the corrected expansion coefficient G(n) is used. Because the ideal expansion coefficient Gid(n) is determined from the expansion coefficient LUT 210 that is set in accordance with the white peak value WP and the APL value, if the ideal expansion coefficient Gid(n) is used, brightness range expansion processing that is appropriate for the brightness histogram of the image data can be performed. The setting of the expansion coefficient LUT 210 is described in detail below.

The brightness range expansion processor 300 expands the brightness range for image data based on the ideal expansion coefficient Gid(n) or corrected expansion coefficient G(n) output by the expansion coefficient derivation module 200 through the steps S1000A-S2410 in FIG. 6. This brightness range expansion processing is carried out based on the equations (13a)-(13e) below. Here, R0, G0, B0 are values representing color information for the image data before brightness range expansion processing, while R1, G1, B1 are values representing color information for the image data after brightness range expansion processing. The expansion ratio K1 is given by the equations (13d) or (13e).

$$R1 = K1 \times R0 \quad (13a)$$

$$G1 = K1 \times G0 \quad (13b)$$

$$B1 = K1 \times B0 \quad (13c)$$

$$K1 = 1 + Gid(n)/255 \quad (13d)$$

$$K1 = 1 + G(n)/255 \quad (13e)$$

Both of the ideal expansion coefficient Gid(n) and corrected expansion coefficient G(n) are equal to or larger than 0. Therefore, the expansion ratio is equal to or larger than 1.

The brightness range expansion processor 300 then controls the light valve 400 based on the brightness range expansion-processed image data.

Figure 15:
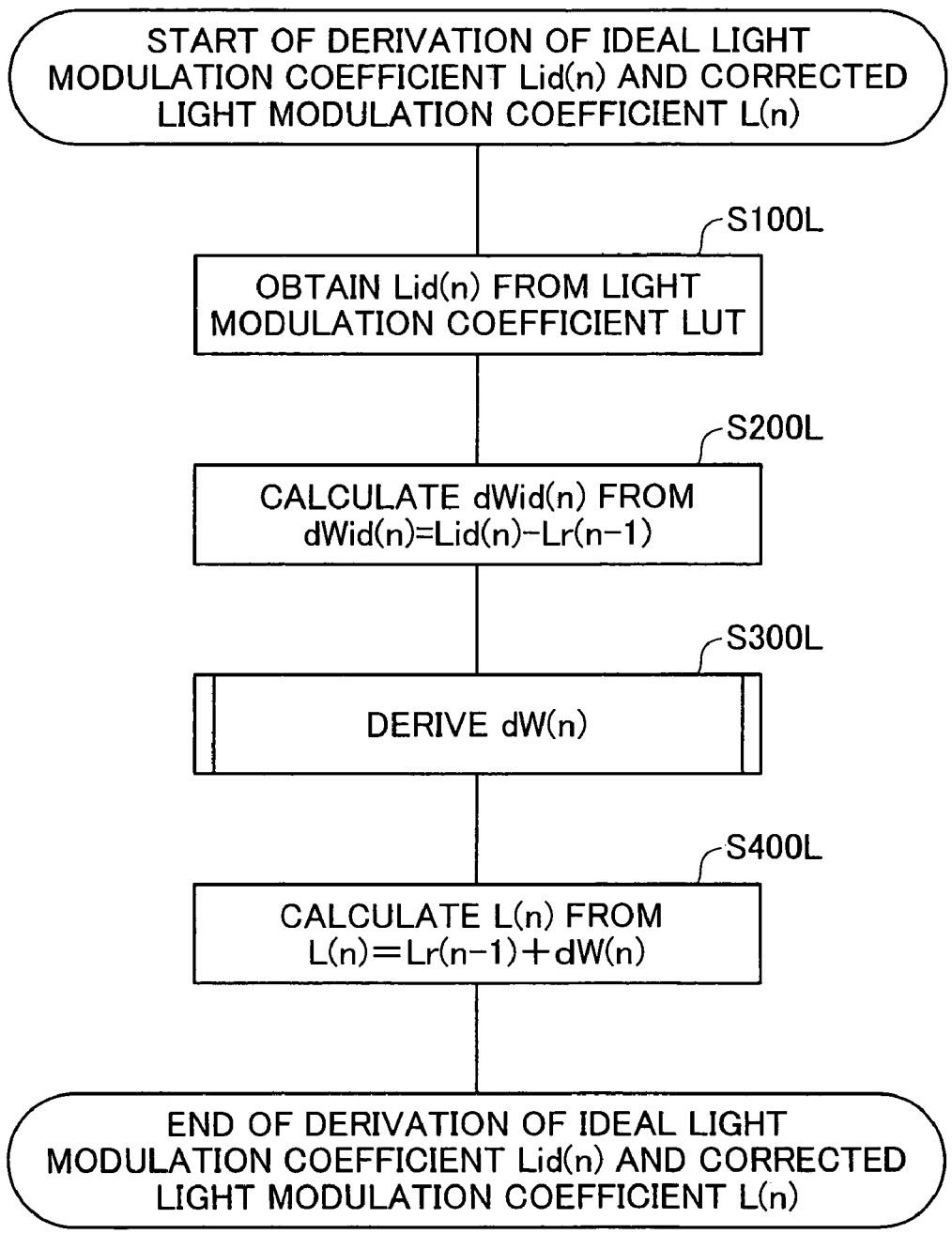
FIG. 15 is a flow chart showing derivation process to obtain ideal light modulation coefficient Lid(n) and corrected light modulation coefficient L(n) in step S1000L of FIG. 9.

A-3. Calculation of Light Modulation Coefficient:

FIG. 15 is a flow chart showing derivation process to obtain the ideal light modulation coefficient Lid(n) and the corrected light modulation coefficient L(n) in step S1000L of FIG. 9. As can be seen from a comparison of FIGS. 10 and 15, the flow chart of FIG. 15 is similar to that of FIG. 10, but the expansion coefficient G is replaced with the light modulation coefficient L. Since the processing for deriving the ideal light modulation coefficient Lid(n) and the corrected light modulation coefficient L(n) is similar to the processing for deriving the ideal expansion coefficient Gid(n) and the corrected expansion coefficient G(n), detail description will be omitted. The ideal light modulation coefficient Lid(n) can be determined based on the light modulation coefficient LUT 510 shown in FIG. 16.

Figure 16:
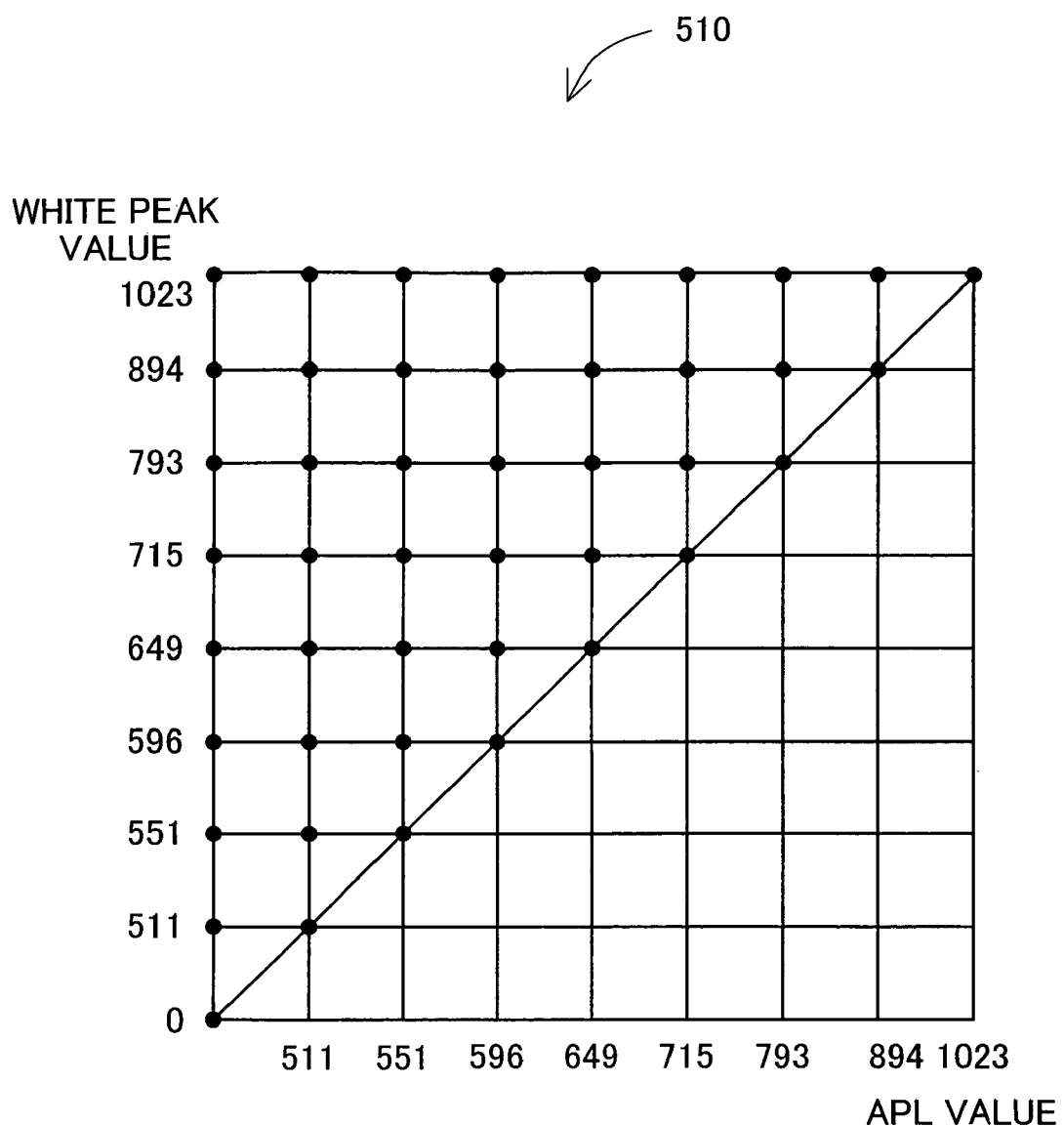
FIG. 16 shows a light modulation coefficient LUT 510.

FIG. 16 shows the light modulation coefficient LUT 510. The horizontal axis represents the APL value and the vertical axis represents the white peak value WP. As can be seen by comparing FIG. 11 and FIG. 16, the light modulation coefficient LUT 510 has a configuration similar to that of the expansion coefficient LUT 210. Since the method for determining the ideal light modulation coefficient Lid(n) with reference to the light modulation coefficient LUT 510 is the same as the method for determining the ideal expansion coefficient Gid(n), detailed description will be omitted.

As the 1D-LUT for deriving the corrected change amount dW(n) in step S300L, the 1D-LUT 220 shown in FIG. 14 may be used, but instead of this, a separate 1D-LUT independently prepared may be used. Where the separate 1D-LUT is used, the corrected change amount dW(k) in the 1D-LUT will be set to have the same sign as the ideal change amount dWid(k) but a smaller absolute value.

The light modulation controller 600 determines a light amount ratio A1 according to the following equation (14a) or (14b) using the ideal light modulation coefficient Lid(n) or corrected light modulation coefficient L(n) output by the light modulation coefficient derivation module 500 through steps S1000L-S2410L shown in FIG. 9, and controls the light modulation element 700 based on the value of the light amount ratio A1. The light amount ratio A1 indicates a percentage of the maximum light amount, such that $A1 \leq 1$.

$$A1 = Lid(n)/255 \quad (14a)$$

$$A1 = L(n)/255 \quad (14b)$$

Incidentally, if the light amount ratio A1 as shown in the equation (14a) and the expansion ratio K1 sought via the equation (13d) have the relationship expressed by the equation (15) below, and if both the expansion coefficient output mode and the light modulation coefficient output mode are the scene change mode, the maximum brightness of the image after brightness range expansion processing and light modulation control is the same as the maximum brightness of the image before brightness range expansion processing and light modulation control.

$$A1 = K1^{-\gamma} \quad (15)$$

Here, γ is the γ-value of the light valve 400, and γ=2.2, for example. The light modulation coefficient LUT 510 of FIG. 16 is established based on the expansion coefficient LUT 210 of FIG. 11 such that the relationship expressed by the equation (15) holds true. In other words, the ideal light modulation coefficient Lid(n) of the light modulation coefficient LUT 510 is set such that the equation (16) holds true.

$$Lid(n)/255 = (1 + Gid(n)/255)^{-\gamma} \quad (16)$$

As can be seen from the equation (16), in the light modulation coefficient LUT 510 of FIG. 16, a lattice point having a specific white peak value WP and a relatively large APL value stores an ideal light modulation coefficient Lid(n) that is larger than an ideal light modulation coefficient Lid(n) stored in a lattice point having the same specific white peak value WP and a relatively small APL value. However, lattice points whose white peak value WP is 1023 stores an ideal light modulation coefficient Lid(n) of 255. Furthermore, a lattice point having a specific APL value and a relatively large white peak value WP stores an ideal light modulation coefficient Lid(n) that is larger than an ideal light modulation coefficient Lid(n) stored in a lattice point having the same specific APL value and a relatively small white peak value WP. A lattice point having a value of 0 for both the white peak value WP and the APL value stores an ideal expansion coefficient Lid(n) of the minimum value (e.g. 56).

In this embodiment, while the expansion coefficient LUT 210 and light modulation coefficient LUT 510 are both configured not to change the maximum brightnesses of two images before and after brightness range expansion processing and light modulation control, these LUTs may be configured using a different relational expression. For example, if the brightness range of image data is widened by a relatively large amount via brightness range expansion processing and the image data is made relatively bright, the light amount may be further increased via light modulation control in order to make the image brighter. Conversely, if the brightness range of image data is widened by a relatively small amount, the light amount may be reduced via light modulation control.

As in the case of the expansion coefficient, the use of the corrected light modulation coefficient L(n) rather than the ideal light modulation coefficient Lid(n) enables sudden changes in the light modulation coefficient from the light modulation coefficient L(n−1) for the previous frame to be suppressed. Namely, in normal mode, it is preferred that the corrected light modulation coefficient L(n) is used. On the other hand, when a scene change occurs, because the image data changes suddenly between frames, it is preferred that the ideal light modulation coefficient Lid(n) capable of responding to sudden changes more effectively than the corrected light modulation coefficient L(n) is used.

Regarding the moving image display apparatus 1000 of the first embodiment described above, if a scene change is detected, the expansion coefficient derivation module 200 can output an ideal expansion coefficient Gid(n) that is suitable for a scene change, and as a result, brightness range expansion processing that is suitable for a scene change can be executed during a scene change. If a scene change is not detected, the derivation module 200 can output a corrected expansion coefficient G(n), and as a result, sudden changes in the expansion coefficient from the previous frame can be suppressed.

Furthermore, since the expansion coefficient derivation module 200 outputs the ideal expansion coefficient Gid(n) from the time that a scene change is detected until the time that a stop condition becomes satisfied, brightness range expansion processing suitable to a scene change can be executed during the above period.

Figure 17A:
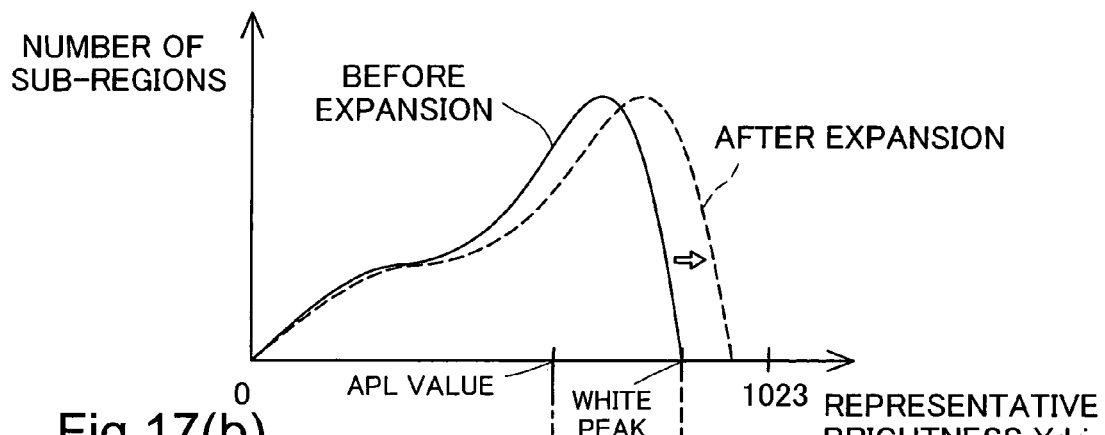
FIGS. 17(a)-17(c) show the thinking behind the setting of the ideal expansion coefficients Gid(n)
Figure 17B:
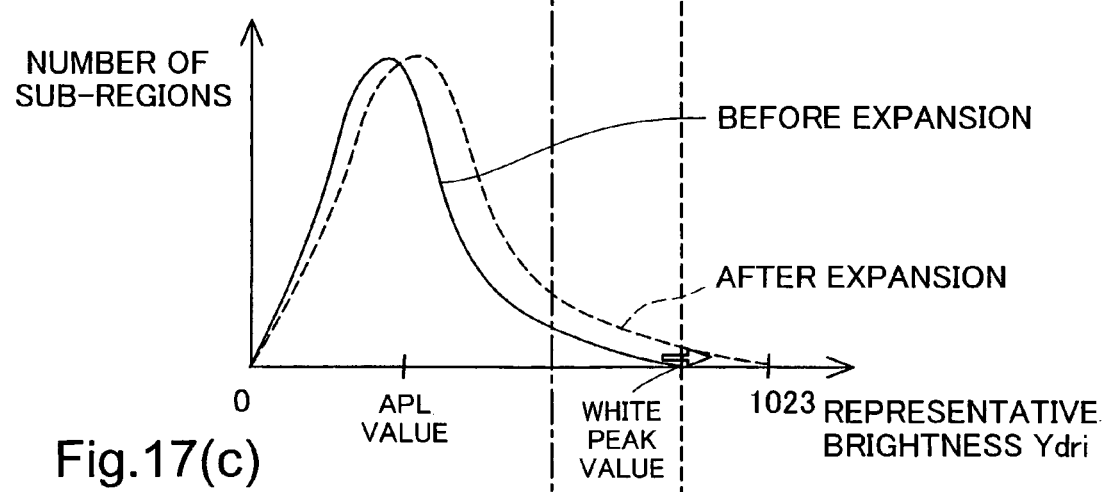
Figure 17C:
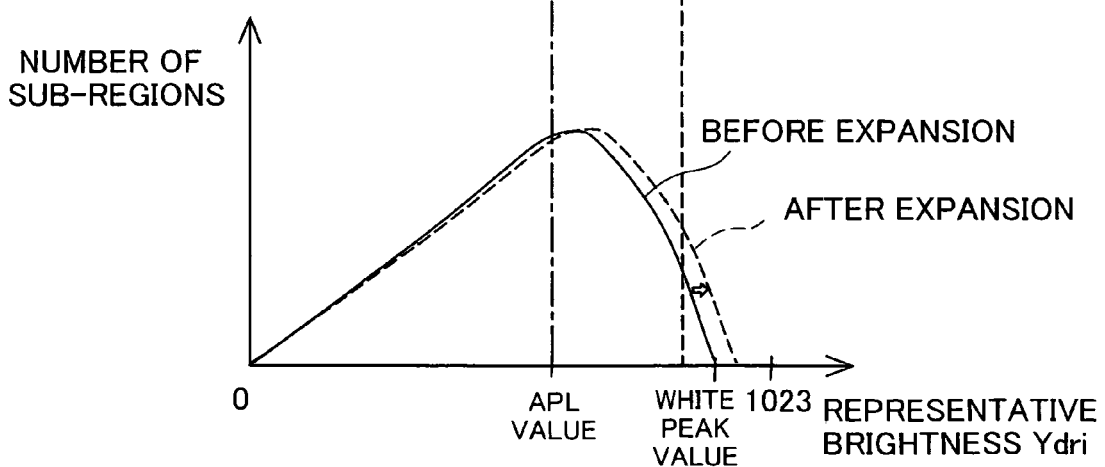

Incidentally, the ideal expansion coefficients Gid(n) in the expansion coefficient LUT 210 can be set according to the standard described below. FIGS. 17(a)-17(c) show the thinking behind the setting of the ideal expansion coefficients Gid(n). The horizontal axes in FIGS. 17(a)-17(c) represent the representative brightness Ydri for the $i^{th}$ sub-region DRi ((i) being arbitral positive integer) and the vertical axes represent the number of sub-regions DR. Namely, the brightness histograms of FIGS. 17(a)-17(c) show brightness distributions of the representative brightnesses Ydri of the sub-regions DRi. Furthermore, in FIGS. 17(a)-17(c), the curves indicated by solid lines are brightness histograms for the image data prior to brightness range expansion processing, and the white peak value WP and APL value for the image data prior to brightness range expansion processing is depicted.

In FIGS. 17(a) and 17(b), two image data prior to brightness range expansion processing have identical white peak values WP, but have different APL values. Because the APL value is closer to the white peak value WP in FIG. 17(a) than it is in FIG. 17(b), the brightness of the entire image is close to the white peak value WP. Therefore, in order to prevent the occurrence of whiteout, in which a majority of the pixels in the entire image become white, the ideal expansion coefficient Gid(n) of the expansion coefficient LUT 210 in the situation shown in FIG. 17(a) is set to be smaller than in the situation shown in FIG. 17(b). In the case of FIG. 17(b), the APL value is smaller and the percentage of pixels relative to the total number of pixels in the image that have a brightness close to the white peak value WP is smaller than in the case of FIG. 17(a). Therefore, even if brightness range expansion processing were performed using a relatively large ideal expansion coefficient Gid(n), the possibility of whiteout occurring would be low. Accordingly, in order to increase the brightness of the entire image, the ideal expansion coefficient Gid(n) is set to a larger value than in the case shown in FIG. 17(a). The curves indicated by dashed lines in FIGS. 17(a) and 17(b) are histograms of image data after brightness range expansion processing is carried out thereto using the ideal expansion coefficients Gid(n) set in this manner. In FIG. 17(a), because the ideal expansion coefficient Gid(n) is relatively small, the likelihood of whiteout occurring in the image data that has undergone brightness range expansion processing can be made small. In FIG. 17(b), because the ideal expansion coefficient Gid(n) is relatively large, the brightness range of the image data can be widened relative to the situation shown in FIG. 17(a).

On the other hand, in FIGS. 17(a) and 17(c), two image data prior to brightness range expansion processing have identical APL values, but have different white peak values WP. Because the white peak value WP in FIG. 17(c) is higher than the corresponding value in FIG. 17(a), in order to prevent the occurrence of whiteout, the ideal expansion coefficient Gid(n) of the expansion coefficient LUT 210 in the situation shown in FIG. 17(c) is set to a value smaller than in the situation shown in FIG. 17(a). The curve indicated by a dashed line in FIG. 17(c) is a histogram of the image data after brightness range expansion processing is carried out thereto using the ideal expansion coefficient Gid(n) set in this manner. In FIG. 17(c), because the ideal expansion coefficient Gid(n) is relatively small, the likelihood of whiteout occurring in the image data that has undergone brightness range expansion processing can be made small. In this way, the expansion coefficient LUT 210 is configured taking into account the APL values, the white peak values WP and the relationship between the two types of values. Note that, in any of the situations shown in FIGS. 17(a)-17(c), the image data after brightness range expansion processing has a wider brightness range than the image data prior to brightness range expansion processing.

As described above, in the moving image display apparatus 1000 of the first embodiment, if the expansion coefficient output mode and the light modulation coefficient output mode are both set to the scene change mode, brightness range expansion processing and light modulation control are executed in accordance with the white peak value WP and APL value obtained from the brightness histogram for the image data. Therefore, brightness range expansion processing and light modulation control suitable to the brightness histogram for the image data can be performed. As a result, the contrast of image can be improved. Further, by configuring the light modulation coefficient LUT 510 using the equation (16), where both the expansion coefficient output mode and the light modulation coefficient output mode are set to the scene change mode, it is possible not to change the maximum brightnesses of two images before and after brightness range expansion processing and light modulation control.

In addition, because the image feature amount calculation module 100 divides one frame into a plurality of sub-regions, seeks the brightness for each sub-region and then determines the APL value and white peak value WP, the image noise can be reduced. Alternatively, the maximum brightness and average brightness of a sub-region residing in a central area of image may be respectively used as the white peak value WP and APL value. In this case, the effects of subtitles and of black bands occurring at the edges of the image can be reduced. Alternatively, the image feature amount calculation module 100 may use the maximum brightness value regarding all pixels in the image data as the white peak value WP and use the average brightness value regarding all pixels as the APL value, without dividing one frame into sub-regions. Namely, it is acceptable if the brightness histograms regarding sub-regions of FIGS. 3, 8 and 17 are brightness histograms regarding pixels of the image data.

In this embodiment, the APL value is used as the image feature amount, but instead of this, a black peak value representing the smallest value among the representative brightnesses Ydr1-Ydr40 of the sub-regions DRi is used. Further, in this embodiment, while the two values including white peak value WP and the APL value are used as the plurality of image feature amounts, the three values including the white peak value WP, the APL value and the black peak value are used. In this case, the expansion coefficient LUT 210 and light modulation coefficient LUT 510 become 3D-LUTs. An even larger number of image feature amounts may be used. The plurality of image feature amounts is not limited to the white peak value, APL value and black peak value, and various other values may be used. Note that, the black peak value may be defined as the smallest brightness value for all pixels.

In this embodiment, because the input/output characteristic of the 1D-LUT 220 (FIG. 14) exhibits origin symmetry, it is acceptable if only the positive region of the 1D-LUT 220 or only the negative region of the 1D-LUT 220 is stored. Further, it is acceptable if only the corrected change amounts dW(k) where the ideal change amounts dWid(k) are integers are stored. In this case, if an ideal change amount dWid(n) is not an integer, the corresponding corrected change amount dW(n) is calculated by interpolation.

In this embodiment, the 1D-LUT 220 is configured based on a straight line 16 for purposes of simplification, but instead of this, the 1D-LUT 220 may be configured based on a curved line, a polygonal line or the like. Further, any other configuration is acceptable so long as the corrected change amount dW(n) has the same sign as the ideal change amount dWid(n) and the absolute value thereof is smaller than the ideal change amount dWid(n), and dW(n) may be determined using various other methods instead of the method employing the 1D-LUT 220. For example, the corrected change amount dW(n) may be determined by dividing the ideal change amount dWid(n) by a constant larger than 1.

In this embodiment, the corrected change amount dW(n) pertaining to the corrected light modulation coefficient L(n) is determined separately from the corrected change amount dW(n) pertaining to the corrected expansion coefficient G(n), but the values having the same absolute value but different signs may be used respectively. This is because if the relationship between the two is set such that if either of the corrected expansion coefficient G(n) or the corrected light modulation coefficient L(n) is increased, the other is reduced by the same amount, perceived sudden changes in the image can be suppressed.

B. Second Embodiment

The second embodiment is similar to the first embodiment, but the second embodiment differs from the first embodiment in regard to the method by which the corrected change amount dW(n) is determined in step S300 in FIG. 10. In the second embodiment, the corrected change amount dW(n) is determined by multiplying a change amount dW1(n) by a correction coefficient ScaleG(n), as shown in the equation (17) below.

$$dW(n)=dW1(n) \times \text{Scale}G(n) \quad (17)$$

Figure 18:
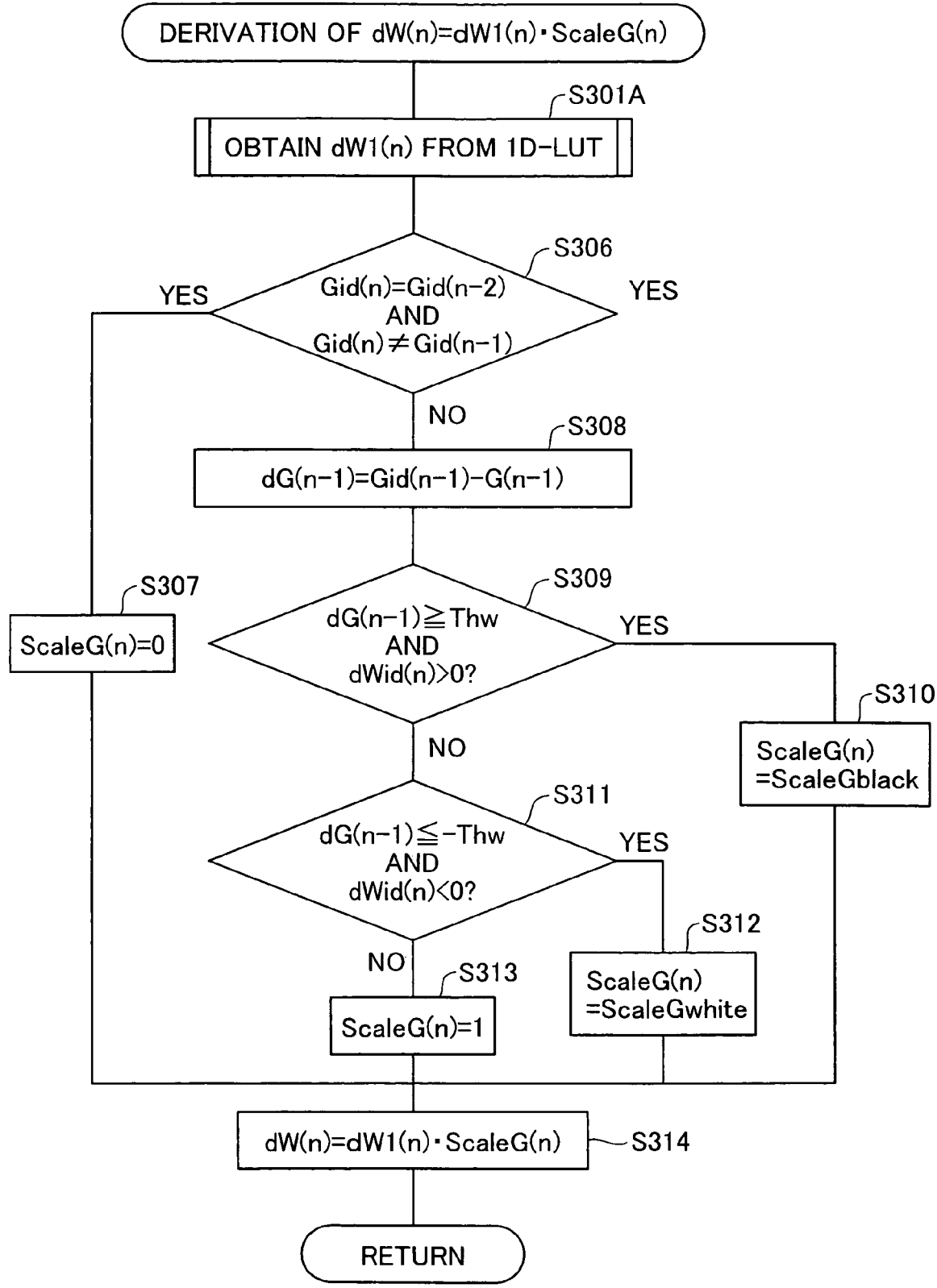
FIG. 18 is a flow chart showing derivation process to obtain corrected change amount dW(n) according to the second embodiment.

FIG. 18 is a flow chart showing derivation process to obtain the corrected change amount dW(n) according to the second embodiment. First, the expansion coefficient derivation module 200 determines the corrected change amount dW(n) from the 1D-LUT 220 of FIG. 14 according to the sequence of operations shown in the flow chart of FIG. 10 in connection with the first embodiment. This corrected change amount dW(n) is termed a change amount dW1(n) below (step S301A).

The expansion coefficient derivation module 200 then seeks the correction coefficient ScaleG(n), as can be seen from the equation (17). If the equations (18) and (19) below hold true (YES in step S306), the expansion coefficient derivation module 200 sets the correction coefficient ScaleG(n) to be 0 (step S307).

$$Gid(n)=Gid(n-2) \quad (18)$$

$$Gid(n) \neq Gid(n-1) \quad (19)$$

If either of the equations (18) or (19) does not hold true (NO in step S306), on the other hand, the expansion coefficient derivation module 200 determines a correction amount dG(n−1) representing a difference between the previous-frame ideal expansion coefficient Gid(n−1) and the previous-frame corrected expansion coefficient G(n−1) via the equation (20) below.

$$dG(n-1)=Gid(n-1)-G(\text{n}-1) \quad (20)$$

If the previous-frame correction amount dG(n−1) is larger than the threshold value Thw and the current-frame ideal change amount dWid(n) is larger than 0 (YES in step S309), the correction coefficient ScaleG(n) is set to a prescribed black correction coefficient value ScaleGblack (step S310). On the other hand, if the previous-frame correction amount dG(n−1) is smaller than "−Thw" and the current-frame ideal change amount dWid(n) is smaller than 0 (YES in step S311), the correction coefficient ScaleG(n) is set to a prescribed white correction coefficient value ScaleGwhite (step S312). In other cases (NO in step S311), the correction coefficient ScaleG(n) is set to 1 (step S313). The corrected change amount dW(n) is then calculated via the equation (15) (step S314). Note that, these correction coefficient values obey the inequality expression (21) below.

$$1 < \text{Scale}G\text{black} < \text{Scale}G\text{white} \quad (21)$$

Figure 19:
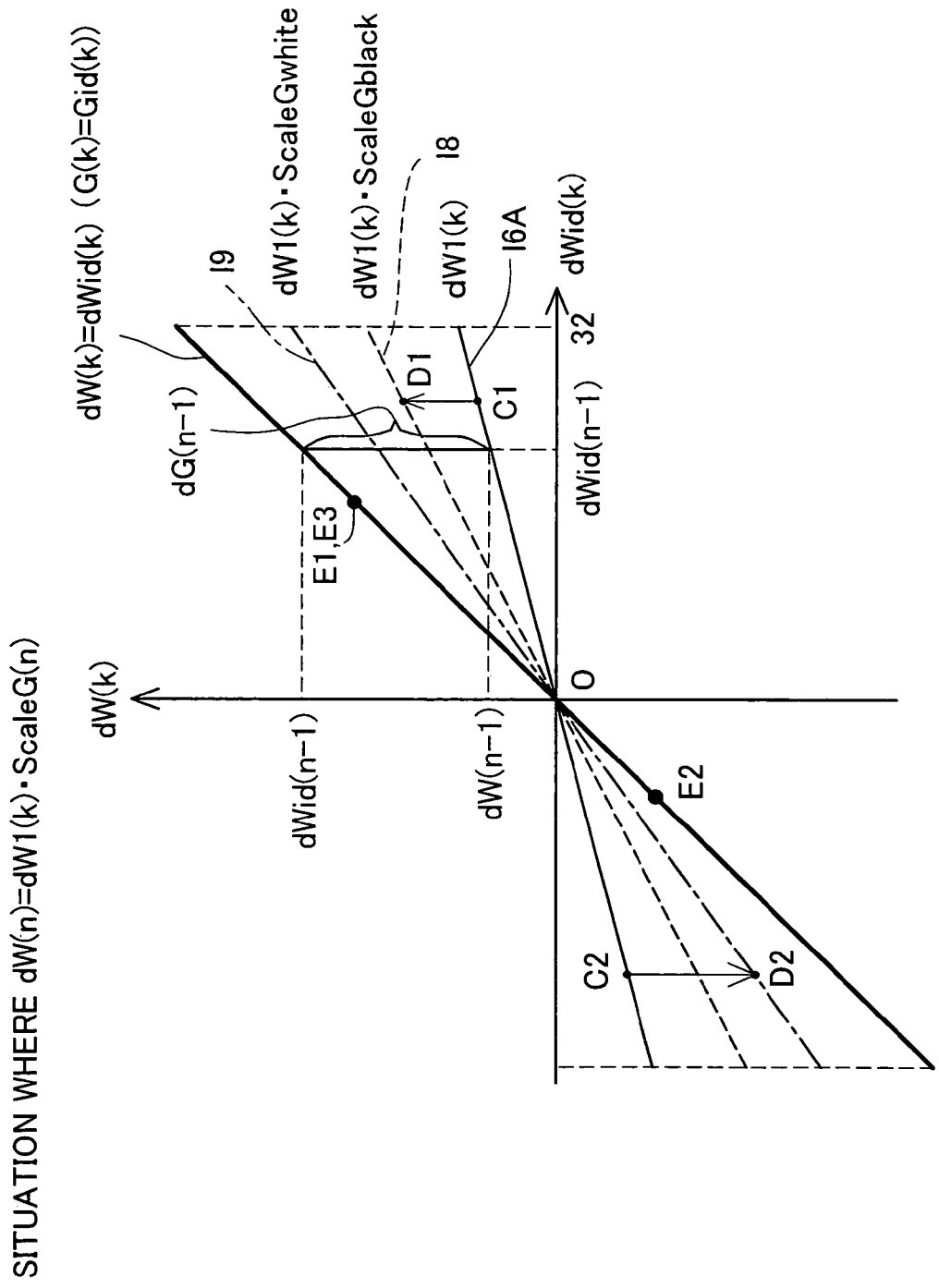
FIG. 19 shows the thinking behind the setting of correction coefficient ScaleG(n)

FIG. 19 shows the thinking behind the setting of the correction coefficient ScaleG(n). The straight line 16A in FIG. 19 is the same as the straight line 16 in FIG. 10, and the straight lines 18 and 19 are added. The straight line 18 is a straight line indicating the corrected change amount dW(k) where the correction coefficient ScaleG(k) is the black correction coefficient value ScaleGblack, while the straight line 19 is a straight line indicating the corrected change amount dW(k) where the correction coefficient ScaleG(k) is the white correction coefficient value ScaleGwhite. The straight line 16A is a straight line that indicates the corrected change amount dW(k) where the correction coefficient ScaleG(k) is 1. From these straight lines relationship, it can be seen that using the white correction coefficient value ScaleGwhite rather than the black correction coefficient value ScaleGblack brings the corrected change amount dW(k) closer to the ideal change amount dWid(k), and brings the corrected expansion coefficient G(k) closer to the ideal expansion coefficient Gid (k) as can be seen from the equations (8) and (9). Similarly, it can be seen that using the black correction coefficient value ScaleGblack rather than the correction coefficient ScaleG(k) =1 brings the corrected change amount dW(k) closer to the ideal change amount dWid(k), and brings the corrected expansion coefficient G(k) closer to the ideal expansion coefficient Gid(k). Note that the correction coefficients ScaleGblack and ScaleGwhite are set such that the correction change amount dW(k) does not exceed the ideal change amount dWid(k).

FIG. 20 is a flow chart showing derivation process to obtain the corrected change amount dW(n) for the corrected light modulation coefficient L(n). The symbols used here are similar to those used in connection with the first embodiment, and L is used in regard to the light modulation coefficient. The flow chart of FIG. 20 is similar to the flow chart of FIG. 18, but the letter "G" regarding the expansion coefficient is replaced by "L" regarding the light modulation coefficient. Since the process of deriving the corrected change amount dW(n) for the corrected light modulation coefficient L(n) is similar to the process of deriving the corrected change amount dW(n) for the corrected expansion coefficient G(n), detail description is omitted.

According to the moving image display apparatus 1000 of the second embodiment, by appropriately setting the correction coefficients ScaleG(n), ScaleL(n), it is possible to adjust the value of the corrected change amount dW(n) according to circumstances, and as a result, it is possible to adjust the amount of change in the current-frame corrected expansion coefficient G(n) from the previous-frame actual expansion coefficient Gr(n−1).

For example, the fact that the previous-frame correction amount dG(n−1) is equal to or larger than the threshold value Thw in step S309 means that the difference between the previous-frame ideal expansion coefficient Gid(n−1) and the previous-frame corrected expansion coefficient G(n−1) is too large. Here, because the correction amount dG(n−1) is the difference between the ideal change amount dWid(n−1) and the corrected change amount dW(n−1), as can be seen from the equation below that uses the equations (8) and (9), it corresponds to the range dG(n−1) shown in FIG. 19 (however, the correction coefficient ScaleG(n−1) is set to be 1).

$$\begin{aligned}dG(n-1) &= Gid(n-1) - G(n-1) \\ &= \{dWid(n-1) + Gr(n-2)\} - \{dW(n-1) + Gr(n-2)\} \\ &= dWid(n-1) - dW(n-1)\end{aligned} \quad (22)$$

Therefore, regarding the current frame (the $n^{th}$ frame), by determining the corrected change amount dW(n) using the black correction coefficient value ScaleGblack that is larger than 1, the corrected expansion coefficient G(n) is brought closer to the ideal expansion coefficient Gid(n) than it would be if the correction coefficient ScaleG(n−1)=1 were used. This corresponds to a change in FIG. 19 from the coordinate point C1 where the correction coefficient ScaleG(n)=1 is used to the coordinate point D1 where the black correction coefficient value ScaleGblack is used, for example. The fact that the difference between the previous-frame ideal expansion coefficient Gid(n−1) and the previous-frame corrected expansion coefficient G(n−1) is too large means that the previous-frame ideal expansion coefficient Gid(n−1) is extremely large, and means that the image prior to brightness range expansion processing is extremely dark. In this embodiment, the image can be brightened by performing brightness range expansion processing using the corrected expansion coefficient G(n) that is brought closer to the ideal expansion coefficient Gid(n).

On the other hand, the condition of step S311 is the opposite of the condition of step S309, and the inequality expression (23) below holds true. This means that the ideal expansion coefficient Gid(n−1) is extremely small, and means that the image is extremely bright.

$$G(n-1) - Gid(n-1) > Thw \quad (23)$$

Therefore, in order to prevent whiteout, it is preferred that the corrected expansion coefficient G(n) is brought closer to the ideal expansion coefficient Gid(n) than it is in the situation of steps S309, S310, i.e., where the image is extremely dark. In this embodiment, because the corrected change amount dW(n) is calculated in steps S311, S312 using the white correction coefficient value ScaleGwhite that is larger than the black correction coefficient value ScaleGblack, the corrected expansion coefficient G(n) can be brought more closer to the ideal expansion coefficient Gid(n) and whiteout can be prevented. This corresponds to a change shown in FIG. 19 from the coordinate point C2 where the correction coefficient ScaleG(n)=1 is used to the coordinate point D2 where the white correction coefficient value ScaleGbwhite is used, for example.

If the ideal change amount dWid(n) is a negative value and has a specific absolute value, the expansion coefficient derivation module 200 determines the expansion coefficient G(n) using a first corrected change amount dW(n) whose absolute value is larger than an absolute value of a second corrected change amount dW(n) that is used when the ideal change amount dWid(n) being a positive value and having the above specific value. In this embodiment, the size of the absolute value of the corrected change amount dW(n) is adjusted using the correction coefficient ScaleG(n), but it is alternatively acceptable if the corrected change amount dW(n) is determined by dividing the ideal change amount dWid(n) by a constant that is larger than 1 and is appropriate for steps S310, S312 and S313.

In step S307, if the $(n-2)^{th}$ frame ideal expansion coefficient Gid(n−2) and the $n^{th}$ frame ideal expansion coefficient Gid(n) are equal and they are not equal to the $(n-1)^{th}$ frame ideal expansion coefficient Gid(n−1), the values of the ideal change amounts dWid(n−2), dWid(n−1), dWid(n) pertaining to the ideal expansion coefficients Gid(n−2), Gid(n−1), Gid(n) respectively correspond to the values at the coordinate points E1, E2, E3 in FIG. 19, for example. This means that the ideal expansion coefficient Gid(k) fluctuates. In this case, if the corrected expansion coefficient G(n) is determined based on the current-frame ideal expansion coefficient Gid(n), flickering may occur. Accordingly, in this embodiment, the occurrence of flickering is suppressed in this case by setting the correction coefficient ScaleG(n) to 0 in step S307 and setting the value of the current-frame corrected expansion coefficient G(n) to be equal to the value of the previous-frame actual expansion coefficient Gr(n−1). The expansion coefficient derivation module 200 is a substitution module in the present invention. Note that, the operation of step S307 may be omitted.

If none of the conditions in steps S306, S309, S311 is satisfied, by setting the correction coefficient ScaleG(n) to 1 in step S313, the same advantage obtained in the first embodiment can be obtained.

In the second embodiment, the correction coefficient ScaleL(n) pertaining to the corrected light modulation coefficient L(n) is determined separately from the correction coefficient ScaleG(n), but the same value may be used for the correction coefficients ScaleG(n) and ScaleL(n). In addition, the same value may be used for the black correction coefficient value ScaleGblack and the white correction coefficient value ScaleGwhite.

Other Embodiments (1) While both brightness range expansion processing and light modulation control are carried out in the above embodiments, it is acceptable if only one of the two processes is performed.

(2) The moving image display apparatus 1000 according to the present invention can be applied not only in a projector but also in a variety of moving image display apparatuses, such as in a liquid crystal television. If only brightness range expansion processing is carried out and light modulation control is not performed, the light modulation element 700 may be omitted.

(3) Scene change determinations need not be made according to the method described in the above embodiments, and various other methods may be used. For example, a scene change may be determined if the change in the image feature amount between frames is large.

While the moving image display apparatus, moving image display method and program to execute the functions of such moving image display apparatus and moving image display method pertaining to the present invention are described above based on embodiments, the above embodiments of the invention are provided merely for ease in understanding the present invention, and do not limit the present invention in any way. The present invention may be changed or modified within the spirit and the scope of the Claims, and it naturally encompasses equivalents thereto.

What is claimed is:

1. A moving image display apparatus that displays moving images based on moving image data, comprising:
    an expansion coefficient derivation module that, based on an image feature amount pertaining to a brightness of image data for one frame of the moving image data, derives and outputs an expansion coefficient to be used for brightness range expansion processing that widens the brightness range for the image data, for each frame of the moving image data;
    a brightness range expansion processor that executes the brightness range expansion processing of the image data based on the expansion coefficient output by the expansion coefficient derivation module; and
    a scene change detector that detects a scene change indicating that a scene in the moving image has changed, wherein
    the expansion coefficient derivation module,
    if the scene change is detected, outputs a current-frame ideal expansion coefficient that is determined according to the image feature amount for a current frame, and
    if the scene change is not detected, outputs a current-frame corrected expansion coefficient that is obtained by correcting the current-frame ideal expansion coefficient based on a predetermined rule.

2. A moving image display apparatus according to claim 1, wherein the expansion coefficient derivation module determines the current-frame corrected expansion coefficient such that an absolute value of a corrected expansion coefficient difference is smaller than an absolute value of an ideal expansion coefficient difference and a sign of the corrected expansion coefficient difference is the same as a sign of the ideal expansion coefficient difference, wherein
    the ideal expansion coefficient difference is obtained by subtracting a previous-frame actual expansion coefficient from the current-frame ideal expansion coefficient, the previous-frame actual expansion coefficient being an expansion coefficient used by the brightness range expansion processor for the brightness range expansion processing for a previous frame, and
    the corrected expansion coefficient difference is obtained by subtracting the previous-frame actual expansion coefficient from the current-frame corrected expansion coefficient.

3. A moving image display apparatus according to claim 1, wherein the expansion coefficient derivation module,
    (i) after the scene change is detected, outputs the current-frame ideal expansion coefficient until a predetermined stop condition is satisfied, and
    (ii) after the stop condition is satisfied, outputs the current-frame corrected expansion coefficient.

4. A moving image display apparatus according to claim 3, wherein the stop condition includes at least one of following conditions: (a) a difference between the current-frame corrected expansion coefficient and the current-frame ideal expansion coefficient is equal to or smaller than a predetermined threshold value, and (b) the current-frame ideal expansion coefficient is greater than a previous-frame ideal expansion coefficient derived for a previous frame by the expansion coefficient derivation module.

5. A moving image display apparatus according to claim 1, wherein the scene change detector detects the scene change if a start condition is satisfied, the start condition including a condition 1 holding that a white peak value representing a maximum brightness value of the image data is equal to or smaller than a predetermined threshold value.

6. A moving image display apparatus according to claim 5, wherein the start condition is satisfied if both of the condition 1 and a condition 2 are satisfied, the condition 2 holding that a difference between the current-frame corrected expansion coefficient and the current-frame ideal expansion coefficient is greater than a predetermined value.

7. A moving image display apparatus according to claim 1, wherein the scene change detector detects the scene change in case where, if the brightness range expansion processing is to be executed to the image data using the current-frame corrected expansion coefficient, a ratio of image portions having a brightness value equaling or exceeding a predetermined limit value to all the image is to be equal to or greater than a predetermined threshold value.

8. A moving image display apparatus according to claim 1, wherein
    the image feature amount includes a plurality of image feature amounts obtained with respect to a brightness histogram of the image data, and
    the expansion coefficient derivation module derives the ideal expansion coefficient with reference to a preset expansion coefficient lookup table using the plurality of image feature amounts.

9. A moving image display apparatus according to claim 1, further comprising:

an illumination device;

a light modulation coefficient derivation module that, based on the image feature amount, derives and outputs a light modulation coefficient to be used to modulate a light amount emitted by the illumination device, for each frame of the moving image data; and a light modulation module that performs light modulation for the illumination device based on the light modulation coefficient output by the light modulation coefficient derivation module, wherein the light modulation coefficient derivation module, if the scene change is detected, outputs a current-frame ideal light modulation coefficient that is determined according to the image feature amount for the current frame, and if the scene change is not detected, outputs a current-frame corrected light modulation coefficient that is obtained by correcting the current-frame ideal light modulation coefficient based on a predetermined rule.

* * * * *